(12) United States Patent
Ledbetter

(10) Patent No.: US 12,083,059 B1
(45) Date of Patent: Sep. 10, 2024

(54) UNIVERSAL STEERING SYSTEM

(71) Applicant: Clyde Stephen Ledbetter, Shelby, NC (US)

(72) Inventor: Clyde Stephen Ledbetter, Shelby, NC (US)

(*) Notice: Subject to any disclaimer, the term of this patent is extended or adjusted under 35 U.S.C. 154(b) by 0 days.

(21) Appl. No.: 18/633,124

(22) Filed: Apr. 11, 2024

Related U.S. Application Data

(60) Provisional application No. 63/495,336, filed on Apr. 11, 2023.

(51) Int. Cl.
*A61G 5/10* (2006.01)
*B62D 7/15* (2006.01)

(52) U.S. Cl.
CPC .......... *A61G 5/1051* (2016.11); *B62D 7/1527* (2013.01)

(58) Field of Classification Search
CPC ............................ A61G 5/1051; B62D 7/1527
See application file for complete search history.

(56) References Cited

U.S. PATENT DOCUMENTS

| | | | | |
|---|---|---|---|---|
| 5,409,074 | A * | 4/1995 | Wilson | A61G 5/1051 |
| | | | | 398/127 |
| 10,568,792 | B2 * | 2/2020 | Derenne | A61G 7/08 |
| 11,130,519 | B1 * | 9/2021 | Cui | B66F 9/07568 |
| 11,414,128 | B1 * | 8/2022 | Cui | B62D 7/026 |
| 2005/0236208 | A1 * | 10/2005 | Runkles | B60K 17/303 |
| | | | | 180/254 |
| 2006/0131097 | A1 | 6/2006 | Lim | |
| 2013/0073146 | A1 | 3/2013 | Konomi | |
| 2013/0175103 | A1 * | 7/2013 | Flowers | A61G 5/1051 |
| | | | | 74/491 |
| 2017/0297564 | A1 | 10/2017 | Xi | |
| 2021/0347257 | A1 | 11/2021 | Zalewski | |

OTHER PUBLICATIONS

Torsten Rendler, Jitka Neburkova, Ondrej Zemek, Jan Kotek, Andrea Zappe, Zhiqin Chu, Petr Cigler, and Jörg Wrachtrup, "360 Degree Rotating Car Mechanical Engineering Final Year Project", publication date: Dec. 17, 2021, YouTube, "2 minutes and 32 seconds" [Online] Available:http://www.youtube.com/watch?v=wDF8DR-8Q1c.

Hombal P, Holey S, Chormale P, Mali V, Burute S, Wagh K, "Experimental Analysis of 360 Rotation Wheels", IOSR Journal of Engineering (IOSR JEN), Special Issue, publication date: Jun. 2019, pp. 37-42 [Online] Available:https://www.iosrjen.org/Papers/Conf.19023-2019/Volume-2/7.%2037-42.pdf.

Arunkumar S M, Chandan Kumar Sahu, Yubaraj G M, Jahangeer A B, "360 Degree Wheel Rotation Vehicle", International Journal of Latest Engineering Research and Applications (IJLERA), vol. 02, Issue 05, May 2017, pp. 75-81 [Online] Available: http://www.ijlera.com/papers/v2-i5/part-III/A10.pdf.

* cited by examiner

*Primary Examiner* — Kevin Hurley
*Assistant Examiner* — Marlon A Arce
(74) *Attorney, Agent, or Firm* — NK Patent Law

(57) ABSTRACT

A universal steering system designed for all-wheel drive, remote control, zero turn, and positive traction. The universal steering system is configured to control the wheel deflection of each wheel of a vehicle. The universal steering system is usable for vehicles including automobiles, motorized dollies, floor jacks, toolboxes, tables, carts, skateboards, and other wheeled vehicles.

15 Claims, 19 Drawing Sheets

900

1500

UNIVERSAL STEERING SYSTEM

CROSS-REFERENCE TO RELATED APPLICATION

This application claims the benefit and priority to U.S. Provisional Patent Application No. 63/495,336, filed on Apr. 11, 2023, the entire content of which is incorporated by reference herein in its entirety.

BACKGROUND

The maneuverability of a vehicle is affected by the vehicle's turning radius. Generally, the turning radius of a vehicle is the radius of the smallest circle a vehicle can make while steering at full lock. The function of the vehicle's wheelbase, the front tire width, and the angle of the front wheels are controllable via a typical steering system and affect the turning radius of a vehicle. The turning radius of a vehicle is further affected by the size of the wheelbase. The smaller the wheelbase, the tighter the turning radius. Additionally, the size of the gears and the steering design of a vehicle affect the turning radius.

The turning radius of vehicles is further limited by the structural design of a vehicle. Automobiles have crash rails and engines positioned between the wheels, which limit how far a wheel can turn. Further, many front wheel drive vehicles include an outer constant velocity (CV) joint. Typical axle-CV joints can be angled up to about fifty degrees and anything behind this increases the probability that the balls inside the joint are in danger of falling out or getting damaged. Therefore, most vehicles are limited to the fifty degrees wheel deflection, which increases the turning radius of the vehicle. In addition to the standard automobile, other modes of transportation (e.g., grocery carts) have mobility and maneuverability problems due to the design of the wheelbase.

FIELD OF THE INVENTION

The present invention is generally related to universal steering systems, more specifically to universal steering systems designed for turning in place using separately controllable wheels.

DESCRIPTION OF RELATED ART

Many vehicles are designed for steering around a common radius point. These vehicles typically require a complicated steering mechanism using a chain or belt to drive wheel rotation. Some vehicles are designed for zero turn steering. Zero turn technology typically relies on reversing or regulating the rotations per minute of one or two wheels located at opposite ends of an axle. This requires the use of swivel wheels to provide balance and stability for the vehicle. The swivel wheels do not help with locomotion and often cause problems in soft or rough terrain. This is why zero spin vehicles have been limited to yard equipment and carpet sweepers. Therefore, there is a need for a steering system that eliminates the need for swivel wheels and uses drive wheels that assist the vehicle across rugged areas.

BRIEF SUMMARY

In one embodiment, the present invention includes a universal steering system designed to control the deflection of each wheel of a vehicle, the universal steering system comprising controllable electronics, a wheel deflection system, a steering system, and/or at least one sensor.

In another embodiment, the present invention includes a universal steering vehicle comprising controllable electronics, a wheel deflection system, a steering system, and/or at least one sensor designed to separately control the deflection of each wheel.

In yet another embodiment, the present invention includes a universal steering system designed to adjust the wheel deflection of a vehicle based on the radius of a curve being traversed.

In some embodiments, a universal steering system is disclosed. The universal steering system includes a frame, at least one motor, a plurality of wheels, and at least one processor. The frame is connected to the plurality of wheels. The at least one processor is in electric communication with the plurality of wheels and the at least one motor. The at least one processor is designed to control each wheel of the plurality of wheels. The at least one processor is further operable to deflect at least one wheel of the plurality of wheels.

In some embodiments, the universal steering system further includes a steering system. The steering system includes at least one steering component, at least one actuating mechanism, and at least two steering rods. The at least one steering component is connected to the at least one actuating mechanism and the at least one steering rods. In some embodiments, the at least one actuating mechanism is operable to move the steering component in a counterclockwise motion or a clockwise motion. In some embodiments, each rod of the at least two steering roads is in a geared connection with at least one gear. The at least one gear is connected to at least one wheel of the plurality of wheels. In some embodiments, the at least one actuating mechanism is operable to move the at least one steering component in a counterclockwise motion or a clockwise motion. In response to the movement of the at least one steering component, the at least one steering rods push or pull a corresponding gear. The corresponding gear rotates in response to the push or pull of the at least two steering rods. In some embodiments, in response to the corresponding gear rotating, at least one wheel of the plurality of wheels rotates. In some embodiments, the universal steering system further includes a plurality of motors, wherein the at least one processor is designed to separately control each motor of the plurality of motors.

In some embodiments, a universal steering system is disclosed. The universal steering system includes a frame including a top plate and a bottom plate, a plurality of motors, a plurality of wheels, and at least one processor. The frame is connected to the plurality of wheels. The plurality of motors is in electric communication with the at least one processor. At least one motor of the plurality of motors is connected at least one wheel of the plurality of wheels. The at least one processor, via the plurality of motors, is designed to control each wheel of the plurality of wheels. The at least one processor is operable to deflect at least one wheel of the plurality of wheels.

In some embodiments, the plurality of wheels includes at least two wheels positioned about a front of the frame. The plurality of wheels further includes at least two wheels positioned about a rear of the frame. A deflection of at least one front wheel results in an opposite deflection of at least one rear wheel. In some embodiments, the universal steering system further comprises a steering system. The steering system includes at least one steering component, at least one actuating mechanism, and at least two steering rods. The at least one steering component is connected to the at least one actuating mechanism and the at least two steering rods. In some embodiments, the at least one actuating mechanism is operable to move the steering component in a counterclockwise motion and a clockwise motion. In some embodiments, the universal steering system is a wheelchair. In some embodiments, the plurality of wheels is equally spaced apart.

In some embodiments, a universal steering system is disclosed. The universal steering system includes a frame, at least one motor, a plurality of wheels, and at least one processor. The plurality of wheels is equally spaced apart. The frame is connected to the plurality of wheels via a plurality of shafts. Each wheel is in electric communication with at least one processor. The at least one processor is designed to control each wheel of the plurality of wheels. The at least one processor is operable to deflect at least one wheel of the plurality of wheels.

In some embodiments, the universal steering system includes a plurality of motors. At least one motor of the plurality of motors corresponds to at least one wheel of the plurality of wheels. In some embodiments, the at least one processor is designed to separately control each motor of the plurality of motors. In some embodiments, the universal steering system is a wheelchair. In some embodiments, the universal steering system further includes a steering system. The steering system includes at least one steering component, at least one actuating mechanism and at least two steering rods. The at least one steering component is connected to the at least one actuating mechanism and the at least two steering rods. The at least one actuating mechanism is operable to move the steering component in a counterclockwise motion or a clockwise motion. In some embodiments, each rod of the at least two steering rods is in a geared connection with at least one gear. The at least one gear is connected to at least one wheel of the plurality of wheels. In response to movement of the at least one steering component, the at least two steering rods are operable to push or pull a corresponding gear. The corresponding gear rotates in response to the push or pull of the at least two steering rods.

BRIEF DESCRIPTION OF THE DRAWINGS

The embodiments illustrated, described, and discussed herein are illustrative of the present invention. As these embodiments of the present invention are described with reference to illustrations, various modifications, or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION

Figure 1:
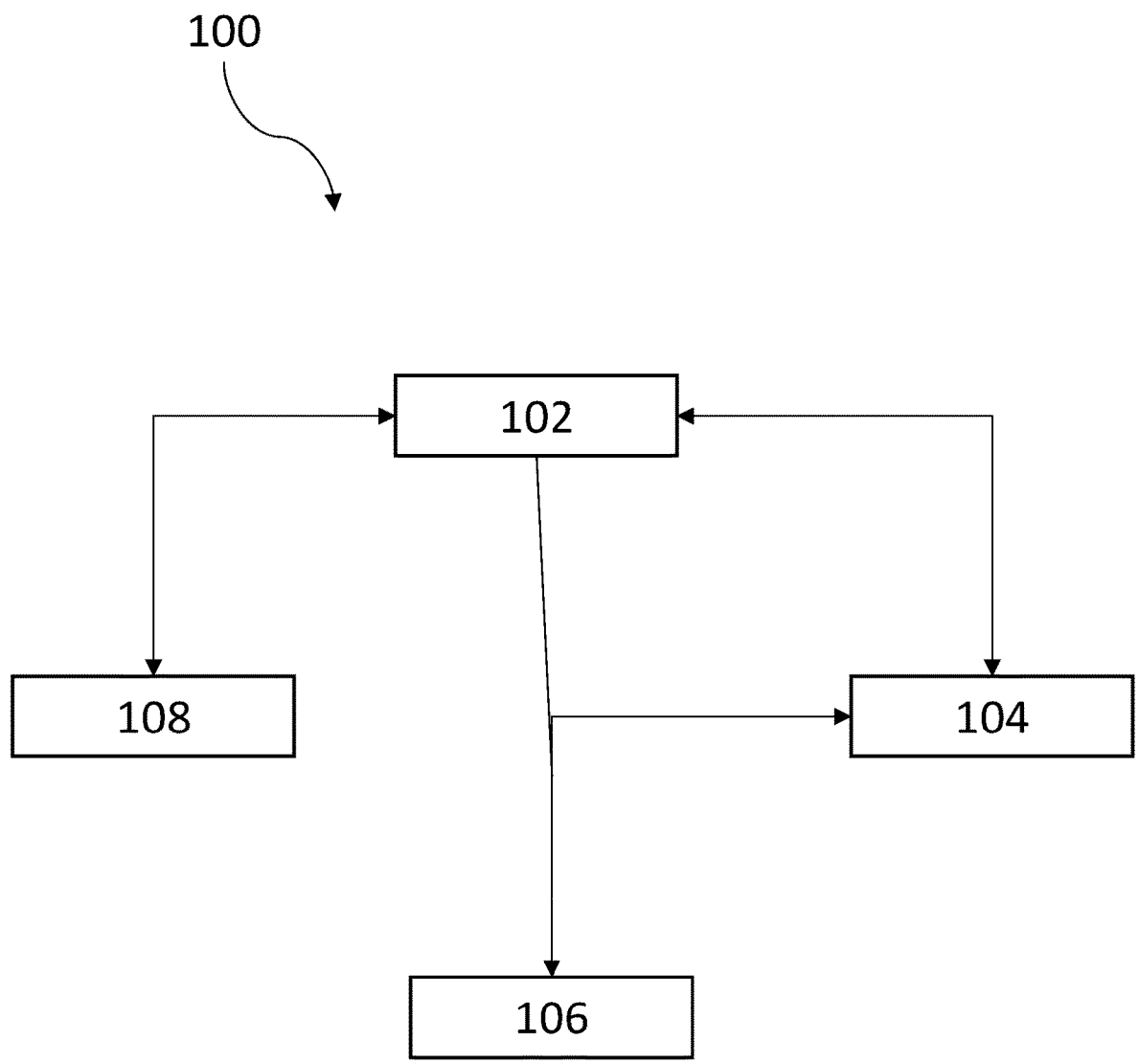
FIG. 1 illustrates a schematic diagram of a universal steering system according to one embodiment of the present invention.

For the purpose of promoting an understanding of the present disclosure, reference will be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e., at least one) of the grammatical object of the article. By way of example, "a composite" means at least one composite and can include more than one composite.

Throughout the specification, the terms "about" and/or "approximately" may be used in conjunction with numerical values and/or ranges. The term "about" is understood to mean those values near to a recited value. For example, "about 40 [units]" may mean within +/−25% of 40 (e.g., from 30 to 50), within +/−20%, +/−15%, +/−10%, +/−9%, +/−8%, +/−7%, +/−6%, +/−5%, +/−4%, +/−3%, +/−2%, +/−1%, less than +/−1%, or any other value or range of values therein or there below. Furthermore, the phrases "less than about [a value]" or "greater than about [a value]" should be understood in view of the definition of the term "about" provided herein. The terms "about" and "approximately" may be used interchangeably.

As used herein, the verb "comprise" as is used in this description and in the claims and its conjugations are used in its non-limiting sense to mean that items following the word are included, but items not specifically mentioned are not excluded.

Throughout the specification the word "comprising," or variations such as "comprises" or "comprising," will be understood to imply the inclusion of a stated element, integer or step, or group of elements, integers, or steps, but not the exclusion of any other element, integer or step, or group of elements, integers, or steps. The present disclosure may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only", and the like in connection with the recitation of claim elements, or the use of a "negative" limitation.

Unless defined otherwise, all technical and scientific terms used herein have the same meanings as commonly understood by one of ordinary skill in the art to which this disclosure belongs. Preferred methods, devices, and materials are described, although any methods and materials similar or equivalent to those described herein can be used in the practice or testing of the present disclosure. All references cited herein are incorporated by reference in their entirety.

Current steering systems can be enhanced by the integration of speed and deflection of wheels. Speed limits are established based on the radius of a curve being traversed. The radius of a one degree curve is approximately 5729.58 feet. Every circular curve has a defined radius. Additionally, curves are also limited by the physical capabilities of a vehicle. For example, if a vehicle has a fixed limit on wheel deflection, then the vehicle is likely to have difficult maneuvering in tight quarters and/or extremely sharp curves.

The present invention reduces flip-overs caused by vehicles traveling too fast for a curve and eliminates wheel drag. The present invention further reduces skid marks, and other lawn damage because the universal steering system tracks around one radius point. The universal steering system is further operable to identify the radius about which a vehicle is revolving and adjust a speed of the vehicle accordingly.

In some embodiments, the present invention includes a universal steering system integrating speed and steering. The universal steering system identifies the radius of any curve in real-time by directing all drive wheels to revolve around a common radius point. The universal steering system instantaneously identifies the design speed and simultaneously regulates the rotations per minute (RPM) of all drive motors for safe passage through the curve.

In some embodiments, the present invention includes a universal steering system for all-terrain vehicles (e.g., four wheeler) and wheeler chairs capable of spinning in place with all-wheel drive, zero turn and positive traction.

In some embodiments, a universal steering system is disclosed. The universal steering system includes a frame, at least one motor, a plurality of wheels, and at least one processor. The frame is connected to the plurality of wheels. The at least one processor is in electric communication with the plurality of wheels and the at least one motor. The at least one processor is designed to control each wheel of the plurality of wheels. The at least one processor is further operable to deflect at least one wheel of the plurality of wheels.

In some embodiments, the universal steering system further includes a steering system. The steering system includes at least one steering component, at least one actuating mechanism, and at least two steering rods. The at least one steering component is connected to the at least one actuating mechanism and the at least one steering rods. In some embodiments, the at least one actuating mechanism is operable to move the steering component in a counterclockwise motion or a clockwise motion. In some embodiments, each rod of the at least two steering roads is in a geared connection with at least one gear. The at least one gear is connected to at least one wheel of the plurality of wheels. In some embodiments, the at least one actuating mechanism is operable to move the at least one steering component in a counterclockwise motion or a clockwise motion. In response to the movement of the at least one steering component, the at least one steering rods push or pull a corresponding gear. The corresponding gear rotates in response to the push or pull of the at least two steering rods. In some embodiments, in response to the corresponding gear rotating, at least one wheel of the plurality of wheels rotates. In some embodiments, the universal steering system further includes a plurality of motors, wherein the at least one processor is designed to separately control each motor of the plurality of motors.

In some embodiments, a universal steering system is disclosed. The universal steering system includes a frame including a top plate and a bottom plate, a plurality of motors, a plurality of wheels, and at least one processor. The frame is connected to the plurality of wheels. The plurality of motors is in electric communication with the at least one processor. At least one motor of the plurality of motors is connected at least one wheel of the plurality of wheels. The at least one processor, via the plurality of motors, is designed to control each wheel of the plurality of wheels. The at least one processor is operable to deflect at least one wheel of the plurality of wheels.

In some embodiments, the plurality of wheels includes at least two wheels positioned about a front of the frame. The plurality of wheels further includes at least two wheels positioned about a rear of the frame. A deflection of at least one front wheel results in an opposite deflection of at least one rear wheel. In some embodiments, the universal steering system further comprises a steering system. The steering system includes at least one steering component, at least one actuating mechanism, and at least two steering rods. The at least one steering component is connected to the at least one actuating mechanism and the at least two steering rods. In some embodiments, the at least one actuating mechanism is operable to move the steering component in a counterclockwise motion and a clockwise motion. In some embodiments, the universal steering system is a wheelchair. In some embodiments, the plurality of wheels is equally spaced apart.

In some embodiments, a universal steering system is disclosed. The universal steering system includes a frame, at least one motor, a plurality of wheels, and at least one processor. The plurality of wheels is equally spaced apart. The frame is connected to the plurality of wheels via a plurality of shafts. Each wheel is in electric communication with at least one processor. The at least one processor is designed to control each wheel of the plurality of wheels. The at least one processor is operable to deflect at least one wheel of the plurality of wheels.

In some embodiments, the universal steering system includes a plurality of motors. At least one motor of the plurality of motors corresponds to at least one wheel of the plurality of wheels. In some embodiments, the at least one processor is designed to separately control each motor of the plurality of motors. In some embodiments, the universal steering system is a wheelchair. In some embodiments, the universal steering system further includes a steering system. The steering system includes at least one steering component, at least one actuating mechanism and at least two steering rods. The at least one steering component is connected to the at least one actuating mechanism and the at least two steering rods. The at least one actuating mechanism is operable to move the steering component in a counterclockwise motion or a clockwise motion. In some embodiments, each rod of the at least two steering rods is in a geared connection with at least one gear. The at least one gear is connected to at least one wheel of the plurality of wheels. In response to movement of the at least one steering component, the at least two steering rods are operable to push or pull a corresponding gear. The corresponding gear rotates in response to the push or pull of the at least two steering rods.

In some embodiments, the present invention includes a universal steering system designed for all-wheel-drive, remote control, zero turn, and positive traction. The universal steering system is used for vehicles including motorized dollies, floor jacks, toolboxes, tables, carts, skateboards, and other wheeled vehicles. The universal steering system includes hub motors, step motors, and linear actuators.

In some embodiments, the present invention includes a universal steering vehicle including a circular box-frame chassis with bumper protection and steering capabilities for turning in place.

In some embodiments, the present invention includes a universal steering wheelchair designed to be a lift chair. The universal steering wheelchair includes an adjustable chair designed to lift a person positioned within the seat while simultaneously opening the seating area for access to the ground. Advantageously, after the person is positioned in the open area, a linear actuator can be used to suspend the person to turn them around and lower them on a commode, bed, and/or chair.

In some embodiments, the present invention includes a universal steering vehicle with four wheels without step motors. The universal steering vehicle is designed to apply a steering deflection ratio between wheels positioned on the right side and wheels positioned on the left side.

In one embodiment, the present invention includes a universal steering system including a plurality of step motors to control wheel deflection of a vehicle. Universal steering enables a vehicle to revolve around any radius with a zero radius being at the center of the vehicle. Wheel deflection is dependent on the wheelbase configuration. For example, and not limitation, the ratio of length to width of a wheelbase determines the deflection curve for a four-wheel symmetrically designed vehicle. The step motors are attached to drive wheels and the drive wheels are controllable to rotate in a desired deflection. Each wheel is separately controllable and designed to revolve about a desired radius point.

In another embodiment, the present invention includes a universal steering system designed for two-dimensional and/or three-dimensional steering. Advantageously, the universal steering system is operable for vehicles on land, in water, under water, in the air and space. For example, and not limitation, the universal steering system is usable for boats, cars, construction equipment, airplanes, drones, all-terrain vehicles, scissor lifts, boom lifts, shopping carts, car jacks, skateboards, and other vehicles. The present invention is designed for all wheel drive, zero turn, and positive traction. Advantageously, the present invention eliminates the needs for transmission, gears, steering roads, and other items that limit the steering capabilities of a vehicle.

In one embodiment, as shown in FIG. 1, the present invention includes a universal steering system 100 comprising controllable electronics 102, a wheel deflection system 104, a steering system 106, and/or at least one sensor 108. The controllable electronics includes at least one processor and memory designed to transmit electrical signals to the wheel deflection system. The controllable electronics is in network communication with the at least one sensor, the wheel deflection system, and the steering system. Additionally, or alternatively, the controllable electronics is in a wired connection with the at least one sensor, the wheel deflection system, and/or the steering system. The at least one sensor is designed to capture internal and external data relating to the universal steering system. For example, and not limitation, the at least one sensor includes an air flow sensor, a voltage sensor, a temperature sensor, a speed sensor, a proximity sensor, a moisture sensor, a light detection sensor, and other similar sensors. The wheel deflection system includes at least one control component and a plurality of wheels. The at least one control component is operable to control the wheel deflection of at least one wheel of the plurality of wheels. For example, and not limitation, in one embodiment, the at least one control component includes a stepper motor. Alternatively, or additionally, the at least one control component includes at least one hub motor, a traction motor, and/or other electric motors. The steering system includes at least one steering control component. For example, and not limitation, the steering control component includes a steering wheel, a gear shift, a steering rod, a steering knob, and other mechanisms and devices for steering. The steering system is operable to control the wheel deflection system. For example, and without limitation, in some embodiments the steering system includes a steering wheel connected to a plurality of wheels via a shaft and spur gears. The steering wheel is operable to turn to the left, resulting in at least one wheel turning in a counterclockwise direction.

In one embodiment, the at least one sensor includes a light detection and ranging sensor. The light detection and ranging sensor is designed to detect an object (e.g., curve, parking spot) and determine a distance to the object. The light detection and ranging sensor is operable to transmit captured light data to the controllable electronics. The controllable electronics are then operable to transmit an electric signal to the wheel deflection system. The electric signal is designed to activate at least one motor or other control feature of the wheel deflection system to deflect at least one wheel of the wheel deflection system.

For further example, in one embodiment, the universal steering system is used in a bicycle wheel configuration with a zero wheelbase width. Universal steering deflection for bicycle configuration (and other in-line two-wheel vehicles) is based on the deflection of the two wheels. The two wheels are controlled by varying the rotations per minute (RPM) of either wheel. This configuration can be applied to vehicles with more than two wheels. For example, and not limitation, if the length between the front and rear wheels of a four-wheel vehicle is zero, then there are effectively two wheels. In this example, to steer this wheel configuration, the RPM of each wheel is varied. Deflection in this case is not available. If the width between the wheels is zero, then the steering functions as a bicycle. The only way to steer this vehicle is by opposite deflections of each wheels from 90 degrees to the left and 90 degrees to the right. In another embodiment, the wheel deflection for a three-wheel vehicle or any similar asymmetrically designed vehicle with multiple drive wheels is based on the placement of each drive wheel around a perimeter of a circle which passes through the center of each drive wheel.

The controllable electronics further include vehicle data including, but not limited to a size of a vehicle, a shape of a vehicle, a number of wheels, a wheelbase length, a wheelbase width, a ratio of wheelbase length to width, motor data, mass data, and other data related to a vehicle. The controllable electronics are designed to determine a corresponding wheel deflection based on the vehicle data and data received from the sensor. For example, and not limitation, the vehicle includes a four-wheel vehicle with a wheelbase length to width ratio of 1:1 and a circular body. In order to turn the four-wheel vehicle around in place, the controllable electronics is operable to determine that at least one of the front wheels must be deflected about 45 degrees and the other front wheel must be simultaneously deflected about 135 degrees.

The ratio of wheelbase length to width determines the general slope of the universal steering curve for a four-wheel vehicle. Generally, as the length between the wheels increases, the slope of the deflection curve decreases. As the width between the wheels increases, the slope of the deflection curve increases. As the length between the wheels approaches infinity the slope of the deflection curve approach zero and the radius about which the vehicle is revolving approaches infinity. As the width between the wheels approaches infinity, the slope of the deflection curves approaches 90 degrees and the radius about which the vehicle is revolving approaches zero. For example, and not limitation, the wheel deflection curve of a four-wheel vehicle with a 1:1 length to width wheelbase ratio includes a wheelbase defection curve with a slope of 3:1. The wheel deflection curve of a four-wheel vehicle with a 3:1 length to width wheelbase ratio follows a curve of about 0.66:1 slope. A wheel deflection curve of a four-wheel vehicle with wheelbase including a 2:1 length to width ratio has a slope of approximately 1.84:1.

Figure 2:
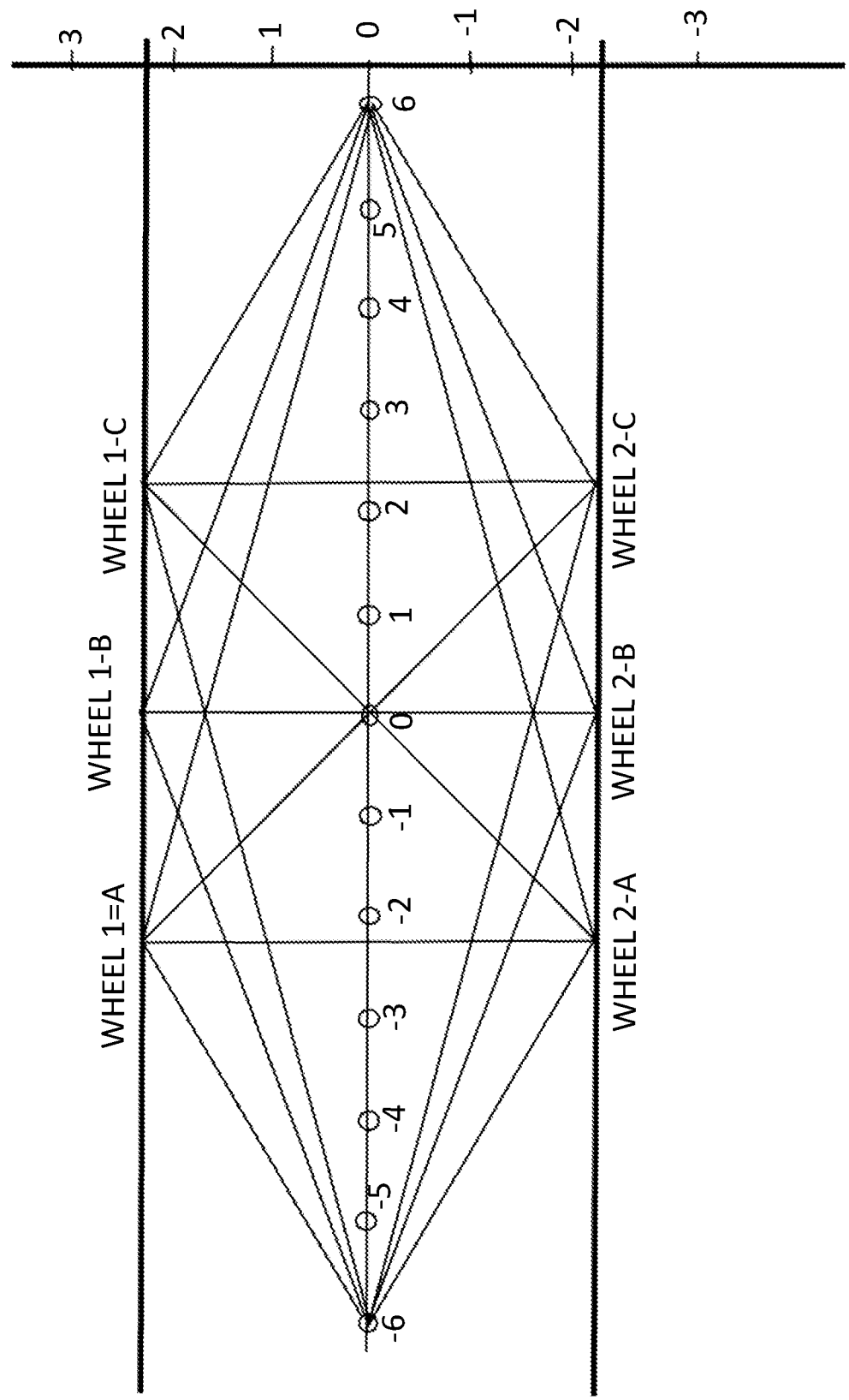
FIG. 2 illustrates a wheel deflection curve for a six-wheel vehicle.

FIG. 2 illustrates a wheel deflection curve for a six-wheel vehicle. In one embodiment, the six-wheel vehicle has the same length and the same width. Each wheel of the six-wheel vehicle is equally spaced apart. For example, and not limitation, a first wheel, a second wheel, and a third wheel are positioned on a first side of the six-wheel vehicle. The second wheel is positioned at equidistance between the first wheel and the third wheel. The first wheel is positioned at distance equal to half of the width of the vehicle from the second wheel. The remaining three wheels are similarly positioned on the opposite side of the second side.

Figure 3:
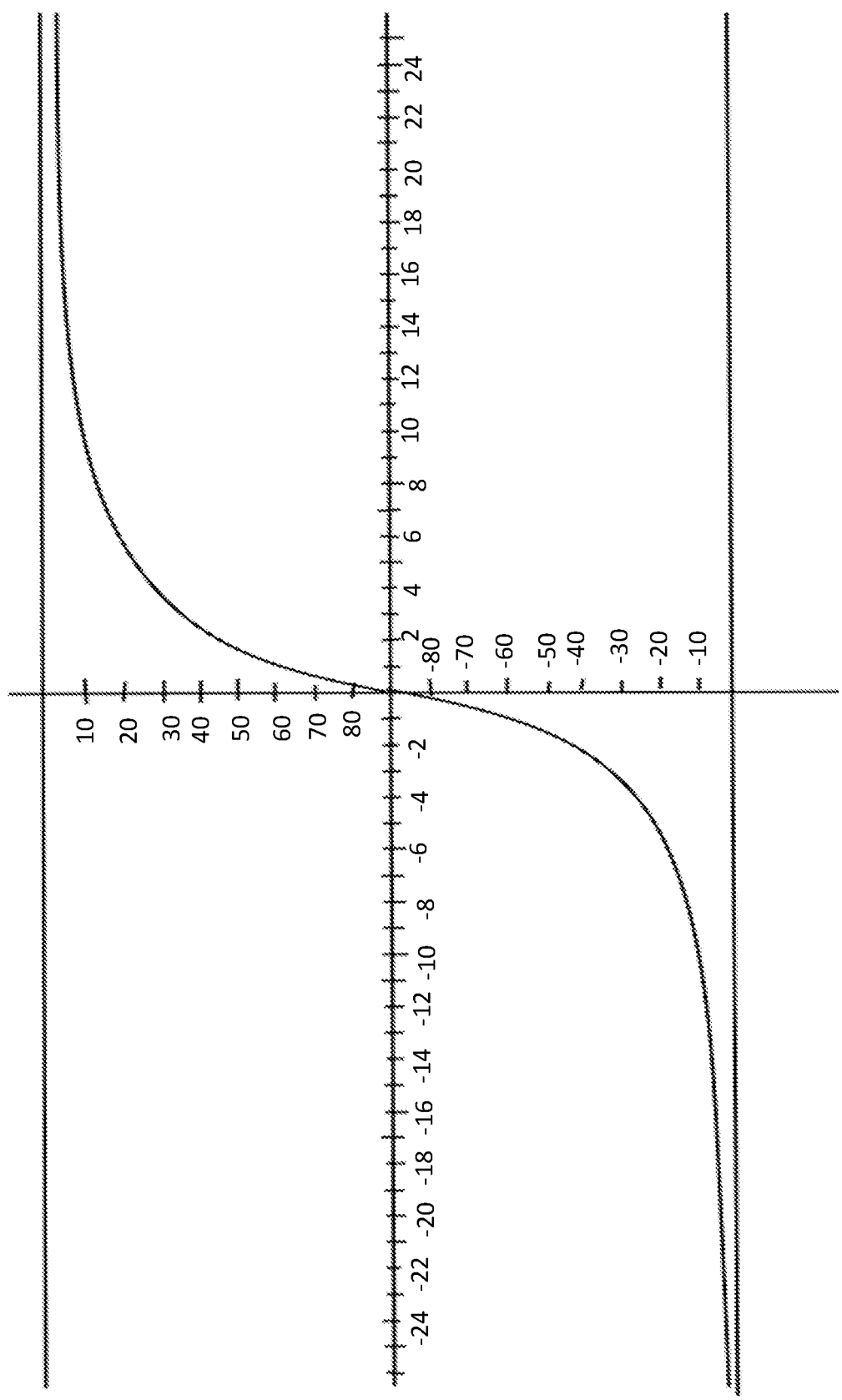
FIG. 3 illustrates a wheel deflection curve for a two-wheel vehicle.

FIG. 3 illustrates a wheel deflection curve for a two-wheel vehicle. The wheel deflection curve is based on the distance between the wheels and the length and width of the wheelbase. For example, and not limitation, as shown in FIG. 3, the deflection of the first wheel is equal to and opposite of the deflection of the second wheel. At a radius of infinity, the deflection of all wheels is about zero degrees.

In some embodiments, the universal steering system is designed for a wheel deflection curve for a vehicle with a wheelbase length to width ratio of 2:1. The slope of the wheel deflection curve is approximately 1.837. At approximately 32.5 degrees and greater angles, wheels positioned on the left side deflect faster than the wheels on the right side of the vehicle.

In some embodiments, the universal steering system is designed for a deflection curve of a six-wheel vehicle with a length to width ratio of 2:1. For example, and without limitation, at a deflection of zero degrees, the turning radius is infinite. At a deflection of ninety degrees, the turning radius is about zero degrees. In some embodiments, the universal steering system can be used with a six-wheel vehicle having a length to width ratio of 3:1. The turning radius of infinity results in a zero degree deflection and a turning radius of zero results in a deflection of ninety degrees. For further example, and not limitation, the universal steering vehicle is configured for one wheel drive, two wheel drive, and three wheel drive. For further example, and with limitation, the universal steering system is designed to synchronize the deflection of at least two wheels based on a speed and/or curve. The universal steering system is operable to deflect each wheel of the at least two wheels at least one degree is a targeted direction to enable the universal steering system to successfully maneuver along a curve or terrain.

In some embodiments, the universal steering system is configured for one wheel drive, two wheel drive, three wheel drive, and four wheel drive. In some embodiments, the universal steering system is designed for a wheel deflection curve for a vehicle with a wheelbase with a 3:1 length to width ratio. In some embodiments, the universal steering system is designed for a wheel deflection curve for 5 wheel deflection of a universal steering system.

In some embodiments, the frame of the universal steering system includes a front side, a back side, a right side, and a left side. The frame further includes a plurality of holes includes a first hole positioned on the top surface of the frame at a corner between the right side and back side, a second hole positioned on the bottom surface that is aligned with the first hole, a third hole positioned on the top surface at the corner of the back side and the left side, a fourth hole positioned on the bottom surface that is aligned with the third hole, a fifth hole positioned on the top surface near the end of the right side towards the front of the frame, a sixth hole positioned on the bottom surface that is aligned with the fifth hole, a seventh hole positioned on the top surface near the end of the left side towards the front of the frame, and an eighth hole on the bottom surface that is aligned with the seventh hole. For example, and without limitation, each hole of the plurality of holes includes a two inches diameter. The distance between the first hole and the third hole is approximately twenty three inches. The distance between the third hole and the seventh hole is approximately twenty three inches. In another embodiment, the frame is made of aluminum and has a wall thickness of approximately 0.25 inches.

Figure 4:
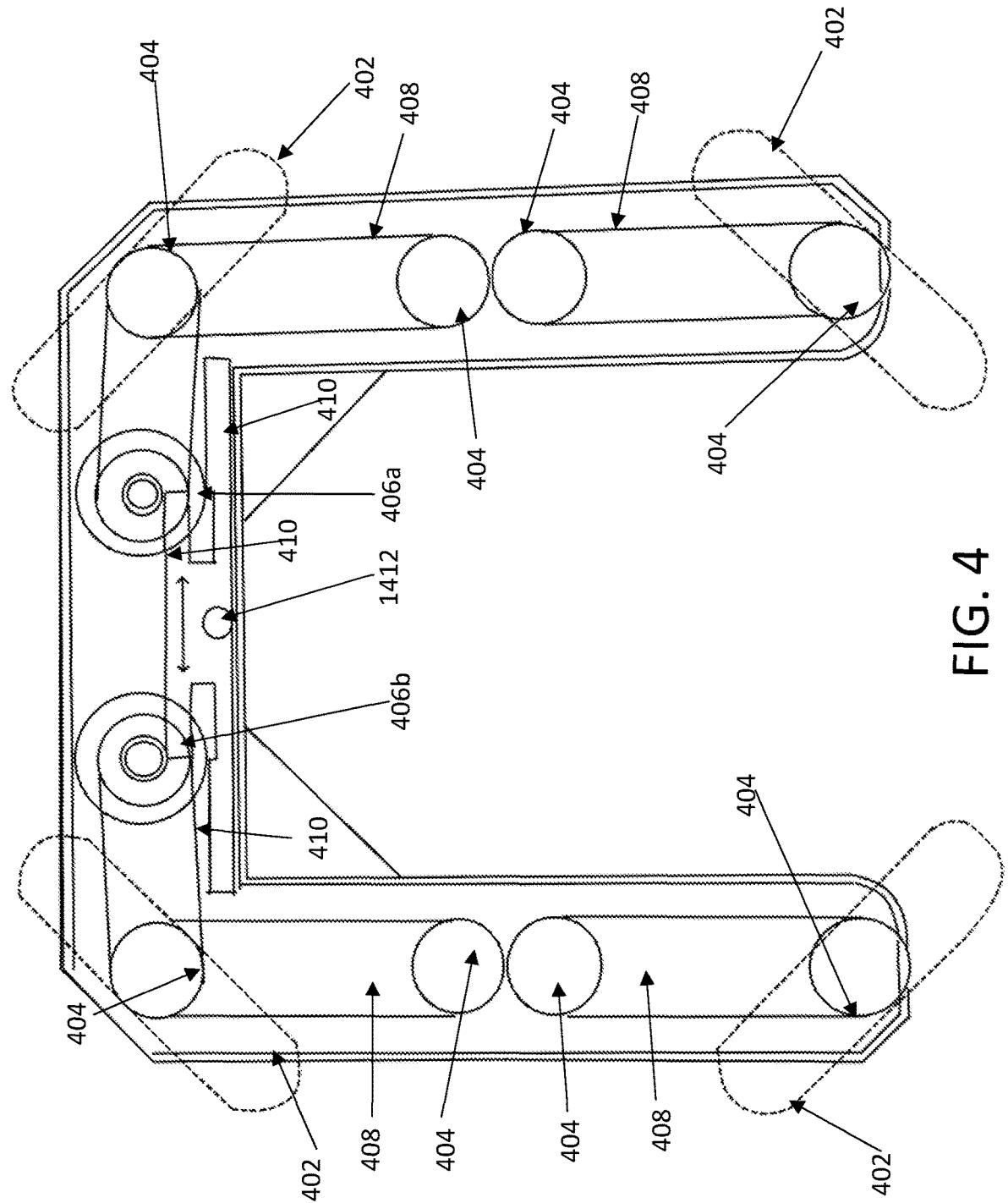
FIG. 4 illustrates a schematic diagram of a frame of a universal steering system according to one embodiment of the present invention.

In one embodiment, the universal steering vehicle includes a mobility support vehicle designed to support an injured and/or disabled person. As shown in FIG. 4, the universal steering vehicle includes a frame attached to a wheelbase. The frame includes a plurality of holes and a brace plate. The wheelbase is positioned underneath the frame in line with the plurality of holes. The mobile support vehicle includes a plurality of wheels 402, a plurality of gears 404, a plurality of gears 406, a first plurality of chains 408, a second plurality of chains 410, and an actuator 412. The plurality of actuator gears 406 are connected and controlled to the actuator 412 via the second plurality of chains 410. For example, and without limitation, in one embodiment, the actuator 412 is operable to move in a horizontal direction. When the actuator 412 moves to the left, the left side actuator gear 406a rotates in response to the actuator movement. This results in a corresponding chain 410 moving because the corresponding chain is connected to the teeth of the actuator gear 406a. The corresponding chain 410 is connected to a left rear wheel 402 via a chain 410 and a gear 404. The left rear wheel turns in response to the chain movement and left rear gear. The rotation of the left rear gear results in movement of a chain 408 connected to another wheel gear 404 positioned about halfway between the rear left wheel and the front left wheel. The second left gear 404 is positioned such that the second left gear is connected to another gear positioned about halfway on the left side via the teeth of both gears. The additional gear rotates in response to the second left gear rotating. This additional gear is connected via a chain 408 to another gear connected to the gear 404. The universal steering vehicle is operable to function in a similar manner if the actuator is moved to the right.

In some embodiments, the plurality of wheels includes a step motor and a hub motor designed to control the angle of the deflection of wheels. The hub motor is connected to the frame via a shaft and a chain. For example, and not limitation, in one embodiment, the present invention includes is mechanically driven without electronics. The universal steering vehicle includes an actuator designed to mechanically control and rotate the wheels and gears. The actuator activates a plurality of connected gears and chains to rotate the wheels. The teeth of the gears are aligned to pull on the track of chains. For example, and not limitation, when an actuating gear is activated, the actuating gear grabs and/or releases a track corresponding to chain to drive the wheels in a desired direction. For example, pushing the actuator to left results in the left side actuator gear engaging a small chain connected to the left side wheels and pulls on the gears and chains corresponding to the left side wheels. Further, an opposite reaction is initiated on the right side that activates the right side actuator gear and corresponding chains. The chains and gears in the universal steering vehicle are positioned such that the chains and gears simultaneously rotate after the actuator is moved.

Figure 5:
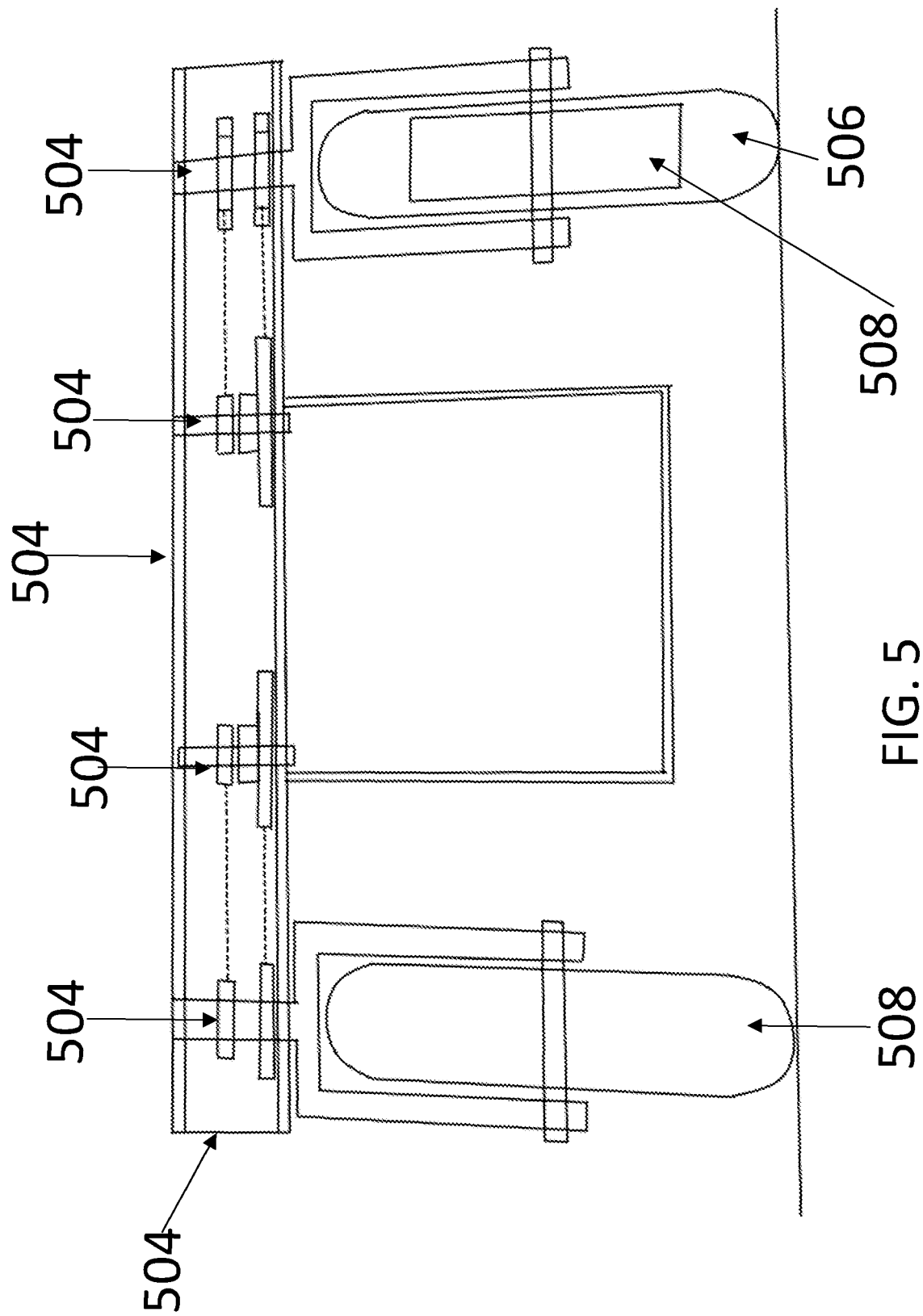
FIG. 5 illustrates a front view of a universal steering system according to one embodiment of the present invention.

FIG. 5 illustrates a universal steering system according to an embodiment of the present invention. The universal steering system includes a frame 502, a plurality of shafts 504, a plurality of motors 506, and a plurality of wheels 508. The plurality of wheels and motors are connected to the frame with the plurality of shafts 504. In some embodiments, each shaft of the plurality of shafts 504 are connected to a second shaft of the plurality of shafts via a chain or similar mechanism. Advantageously, the chain connection enables mechanical synchronization of wheel deflection between connected wheels.

Figure 6:
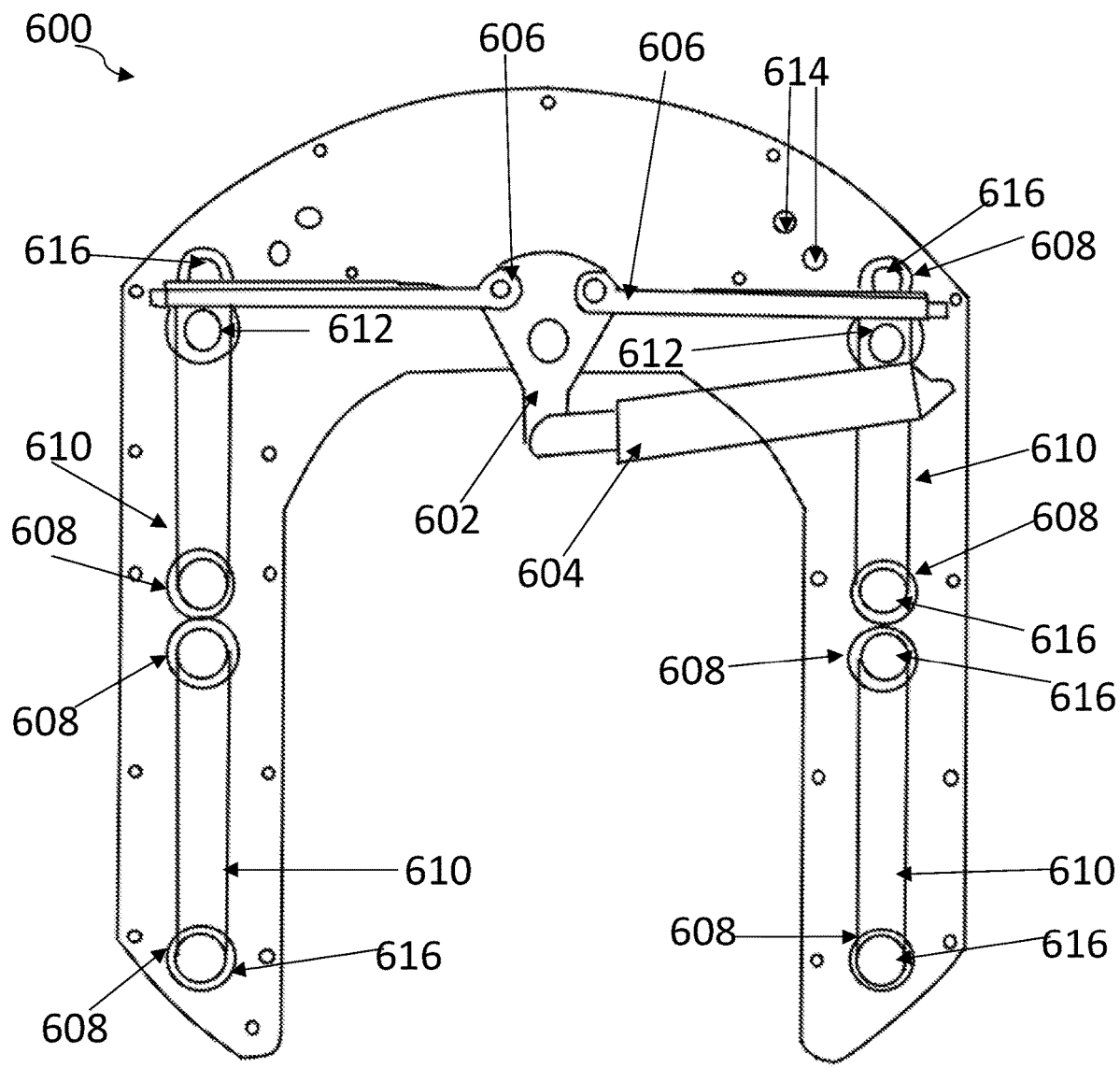
FIG. 6 illustrates a top view of a frame of a universal steering system according to one embodiment of the present invention.

FIG. 6 illustrates a top view of a frame of a universal steering system according to one embodiment of the present invention. In some embodiments, the universal steering system includes a frame 600 including a steering drive swivel component 602, an actuating mechanism 604 (e.g., linear actuator), at least two steering push rods 606, a plurality of spur gears 608, a plurality of chains 610, a plurality of rack stabilizer slots 612, a plurality of wire access holes 614, a plurality of chain tighteners slots (not shown), and a plurality of chain sprockets 616. The steering drive swivel component 602 is connected to the at least two steering push rods 606 and the actuating mechanism 604. The actuating mechanism 604 is designed to push and pull the steering drive swivel component 602 in a clockwise motion and/or a counterclockwise motion. In response to the actuating mechanism, the steering drive swivel component 602 rotates in a clockwise or counterclockwise motion. Additionally, the at least two steering push rods 606 are either pulled or pushed based on the rotation of the steering drive swivel component 602. The at least two steering push rods 606 are connected to at least one spur gear. The at least one spur gear is connected to at least one wheel. The steering push rods are operable to rotate a spur gear. The universal steering system further includes a rack stabilizer slots 612 to maintain contact between a push rod and a spur gear. The spur gear is further connected via a chain to a second spur gear. In response to the rotation of the first gear, the second spur gear also rotates. The second spur gear is mechanically connected to a third spur gear. The third spur gear rotates in response to rotation of the second spur gear. The third gear is connected to a fourth gear, which functions similarly to the third gear. Each side of the frame includes a plurality of gears in connection with chains and/or direct contact. Advantageously, each plurality of gears and wheels rotate in response to movement of the steering drive swivel component, which results in real-time or near real-time rotation of the plurality of wheels.

Figure 7:
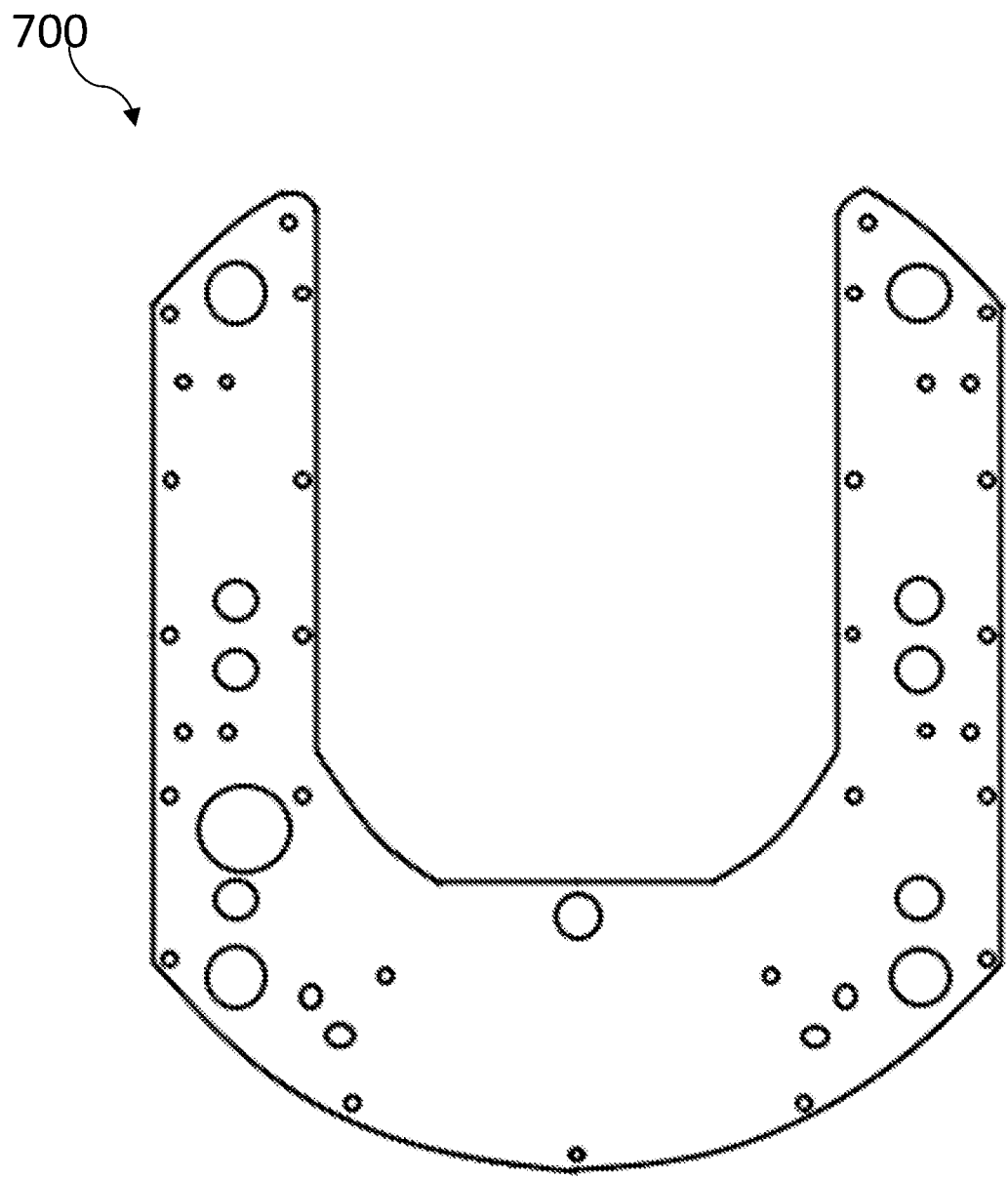
FIG. 7 illustrates a top plate of a frame of a universal steering vehicle according to one embodiment of the present invention.
Figure 8:
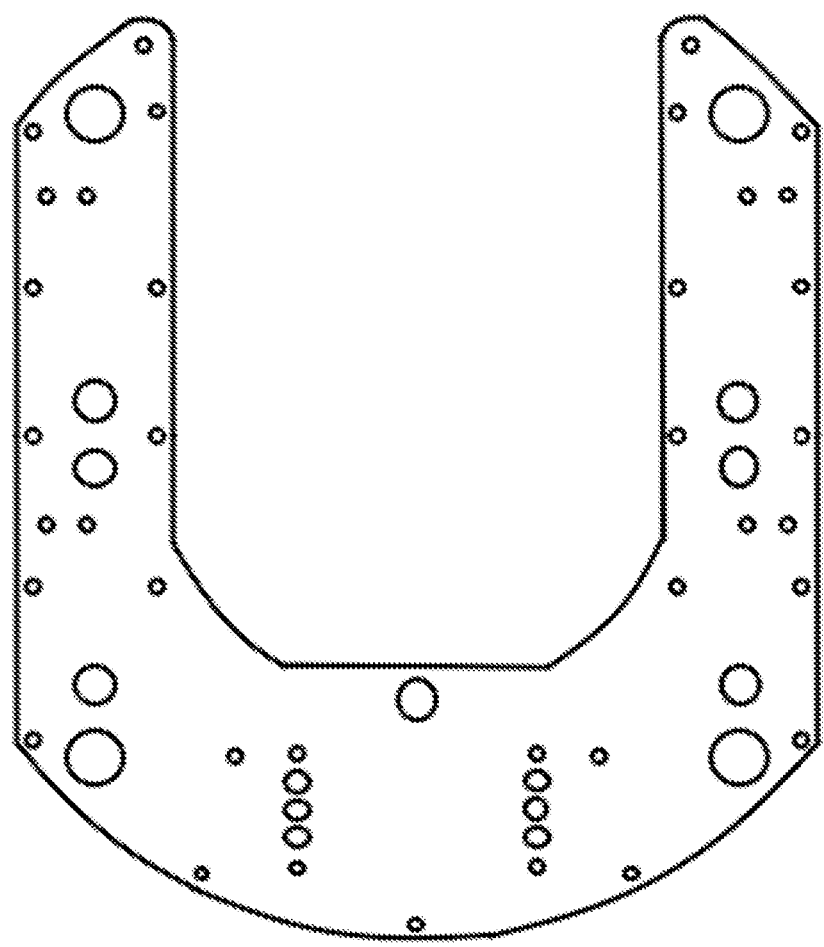
FIG. 8 illustrates a bottom plate of a frame of a universal steering vehicle according to one embodiment of the present invention.
Figure 9:
FIG. 9 illustrates a bar mechanism of a universal steering system according to one embodiment of the present invention.
Figure 10:
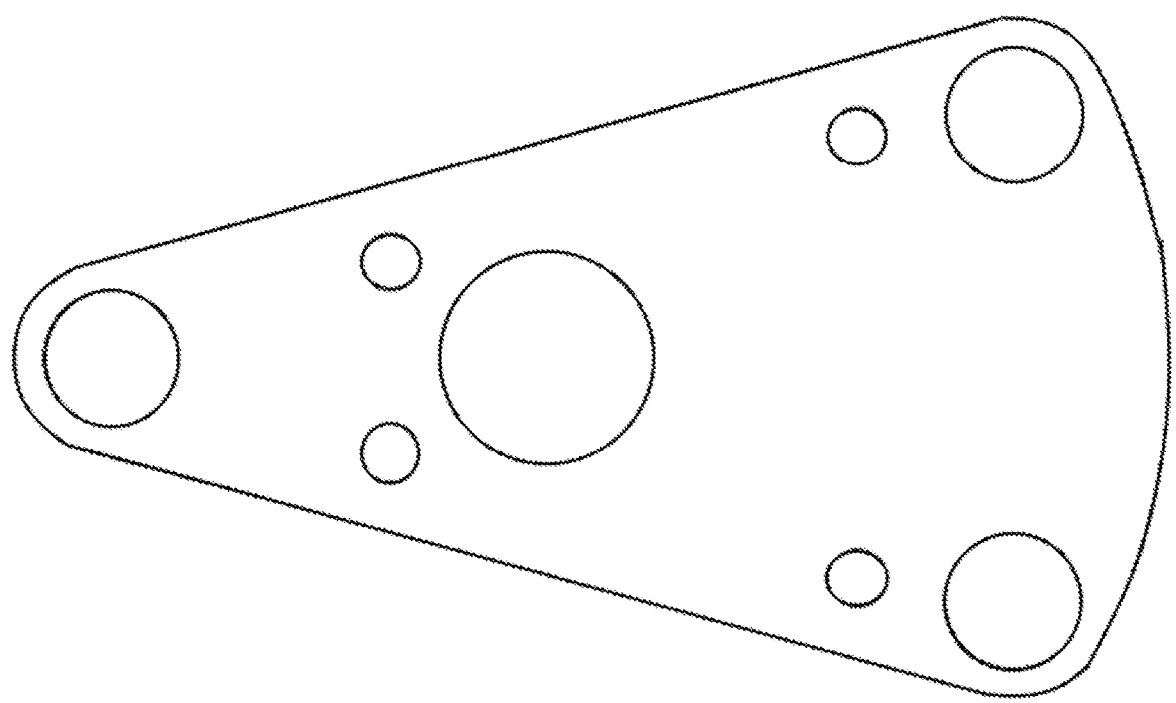
FIG. 10 illustrates a steering component of a universal steering system according to one embodiment of the present invention.
Figure 11:
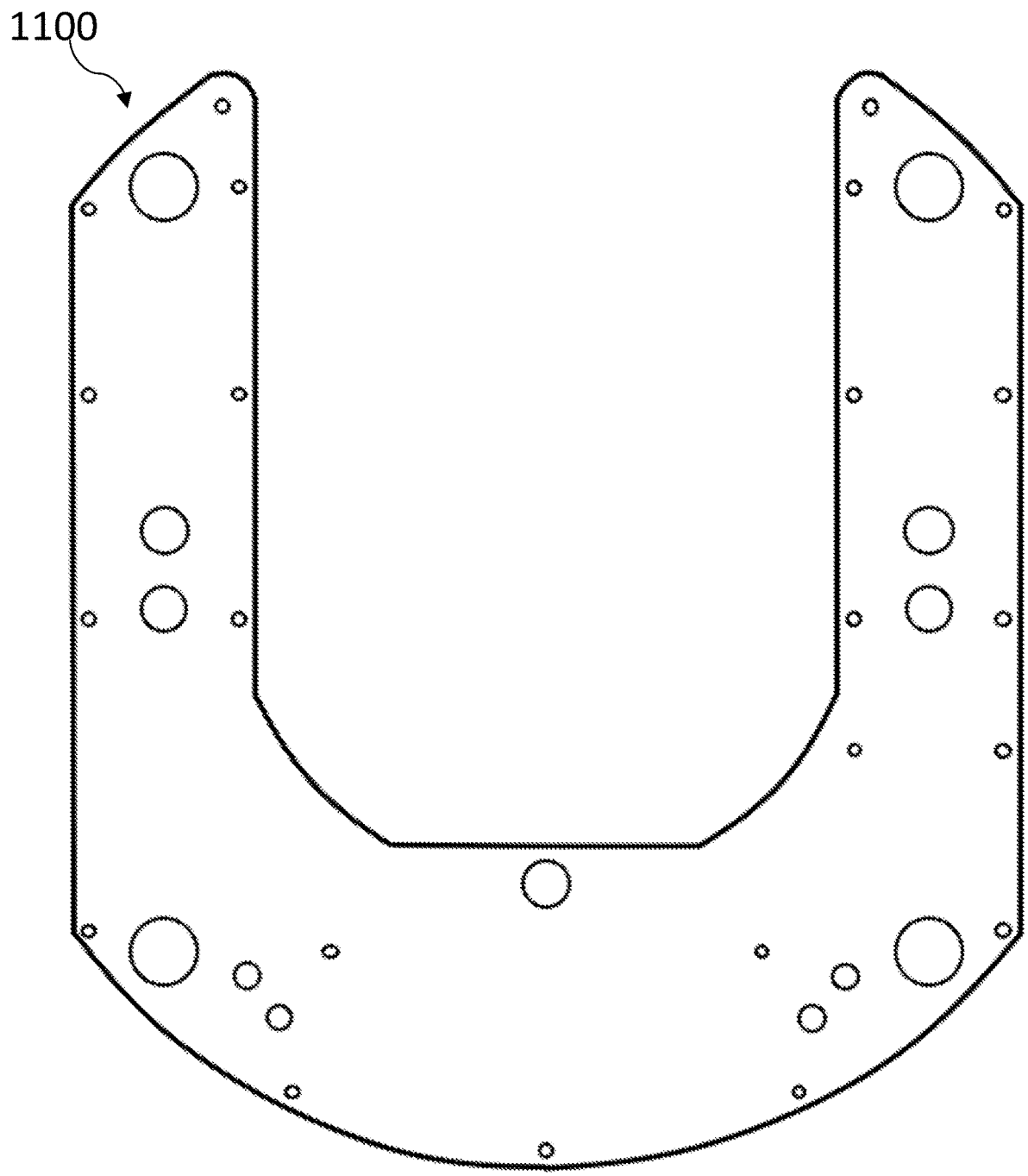
FIG. 11 illustrates a top plate of a frame of a universal steering vehicle according to one embodiment of the present invention.
Figure 12:
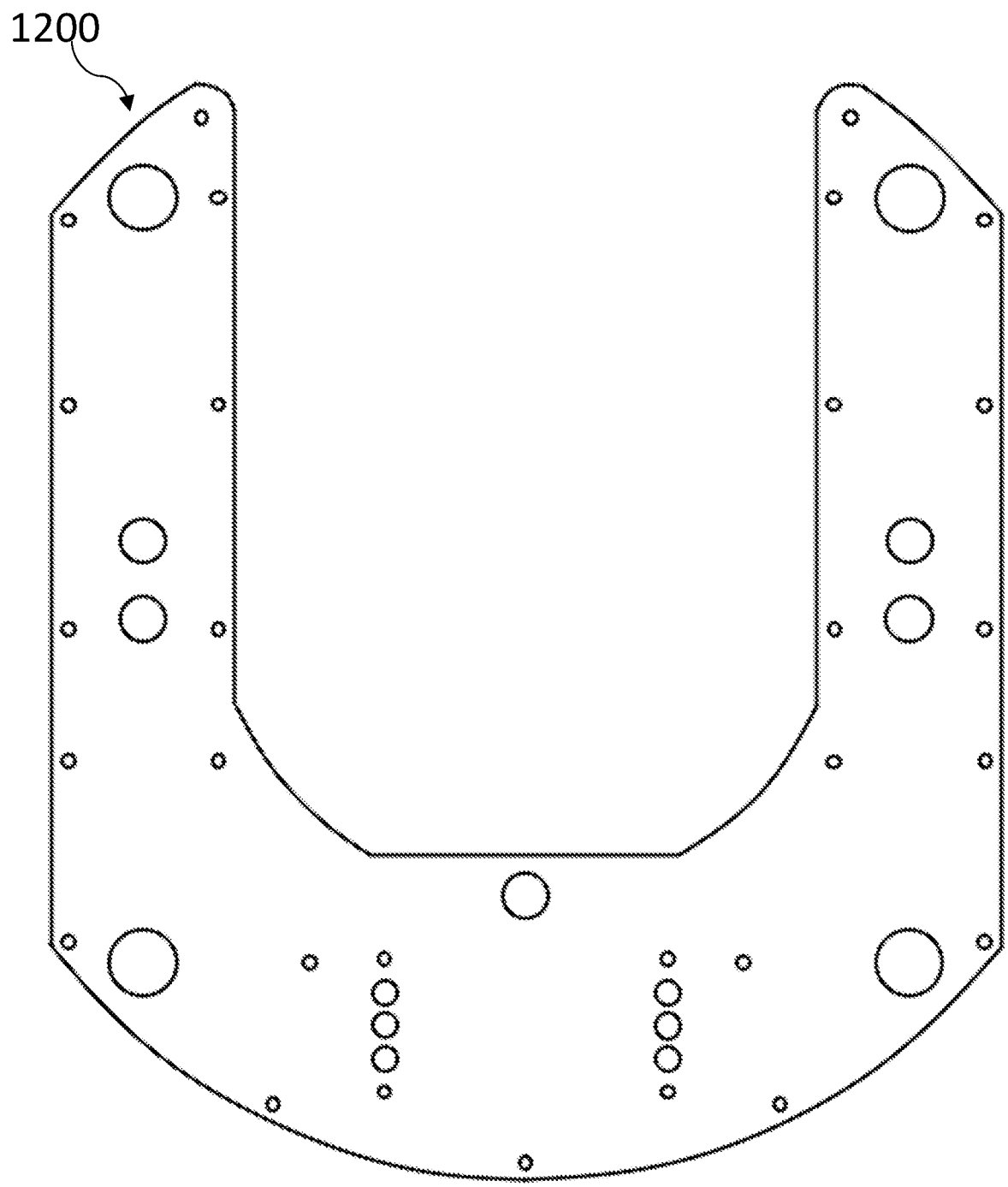
FIG. 12 illustrates a bottom plate of a frame of a universal steering vehicle according to one embodiment of the present invention.
Figure 13:
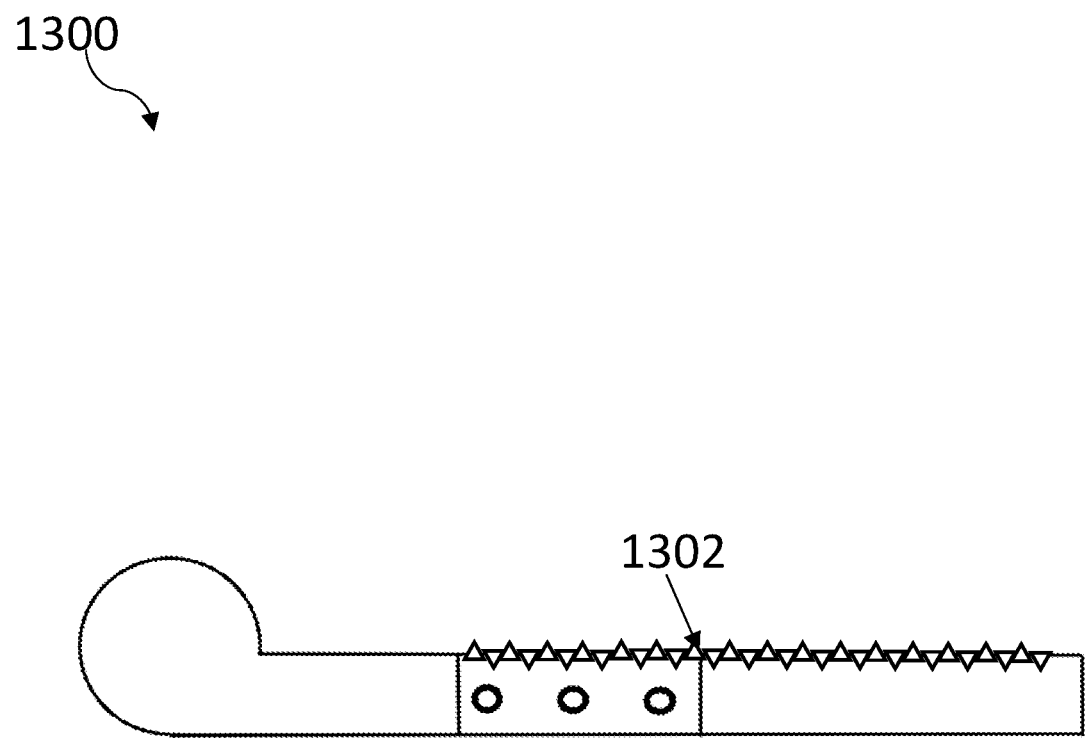
FIG. 13 illustrates a bar mechanism of a universal steering system according to one embodiment of the present invention.
Figure 14:
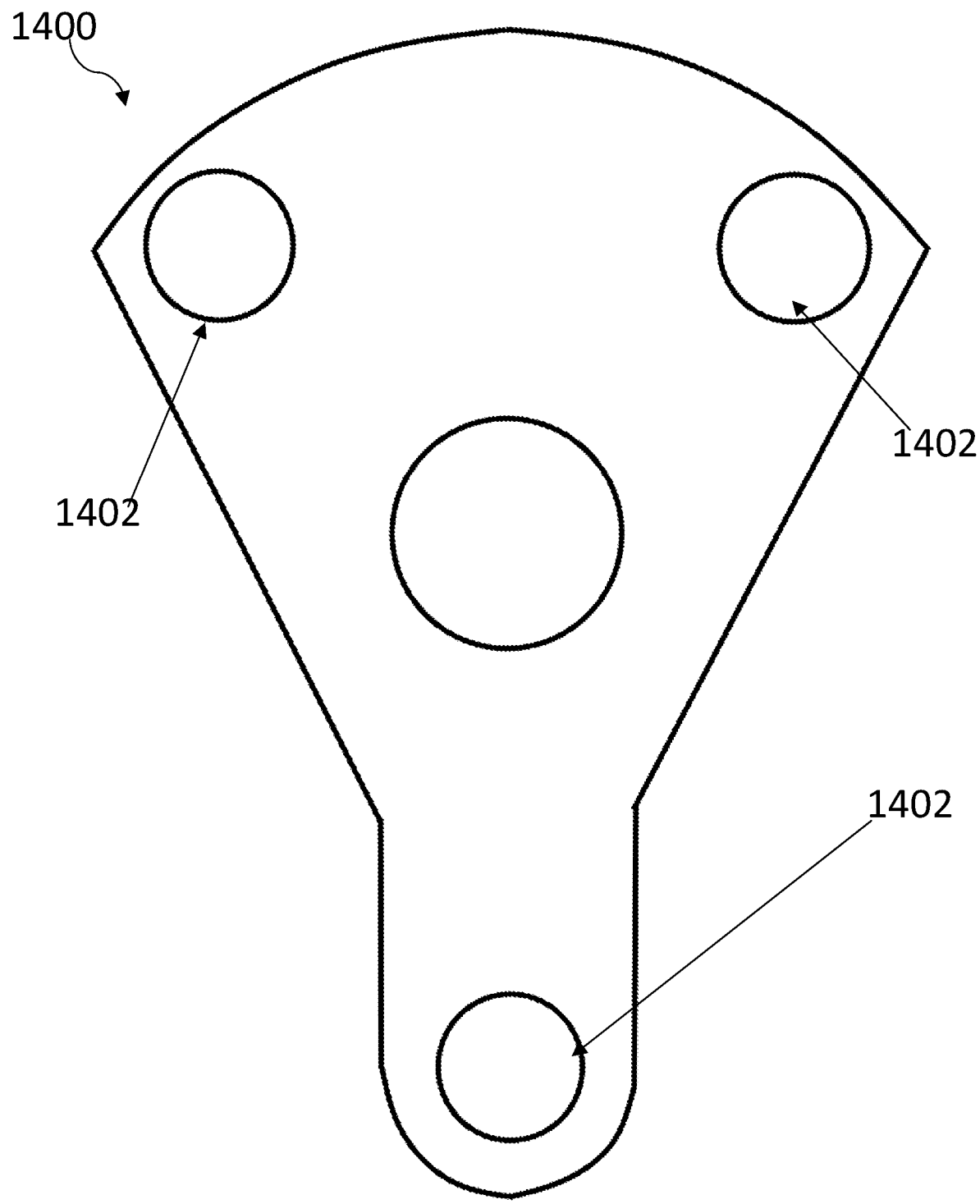
FIG. 14 illustrates a steering component of a universal steering system according to one embodiment of the present invention.
Figure 15:
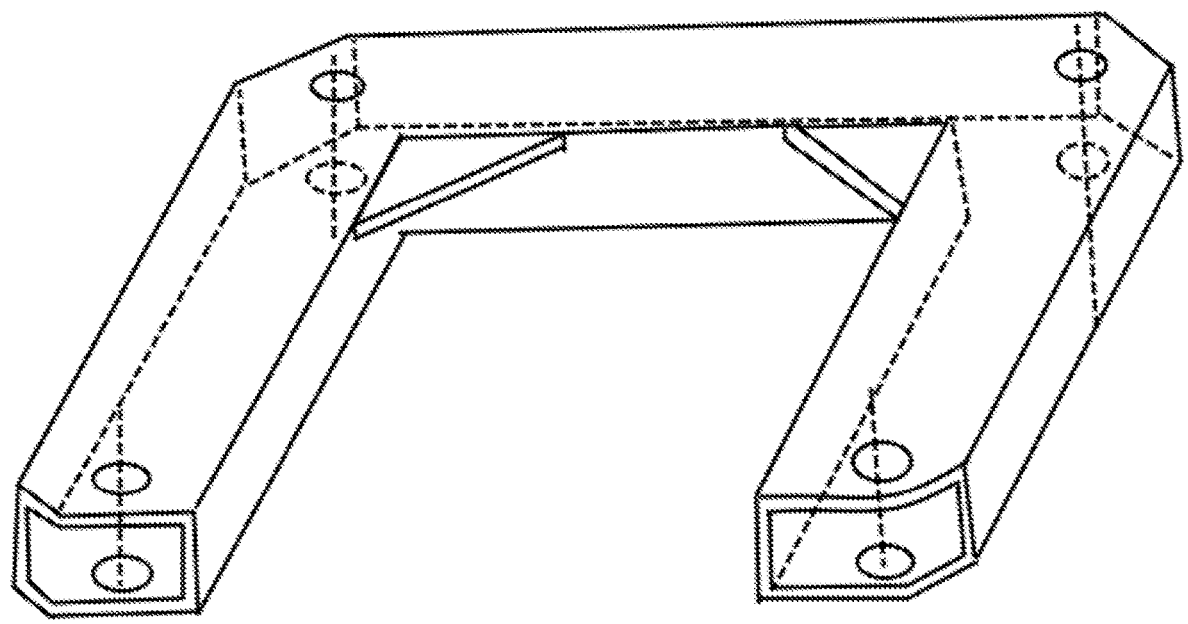
FIG. 15 illustrates a frame of a universal steering system according to one embodiment of the present invention.

FIG. 7 illustrates a top view of a plate of a frame 700 of a universal steering system according to one embodiment of the present invention. FIG. 8 is a top view of a bottom plate of a frame 800 of a universal steering vehicle according to one embodiment of the present invention. The frames 700 and 800 as shown in FIGS. 7 and 8 can include a universal steering system as described for FIGS. 4 through 6. FIG. 9 illustrates an steering mechanism 900 according to one embodiment of the present invention. For example, and without limitation, the steering mechanism 900 is attached to an actuating mechanism and a plurality of gears. The steering mechanism 900 is operable to rotate the plurality of gears to deflect one or more wheels mechanically connected to the plurality of gears. FIG. 10 illustrates a steering mechanism 1000 according to one embodiment of the present invention. For example, and without limitation, the steering mechanism 1000 can be similar to the swivel drive component as shown in FIG. 6. FIG. 11 illustrates a top plate 1100 of a frame according to one embodiment of the present invention. FIG. 12 illustrates a bottom plate 1200 of a frame according to one embodiment of the present invention. FIG. 13 illustrates an push rod 1300 according to one embodiment of the present invention. The push rod 1300 includes a plurality of gear teeth 1302 operable to connect to at least one gear. FIG. 14 illustrates a steering mechanism 1400 according to one embodiment of the present invention. The steering mechanism 1400 is operable to connect to a plurality of steering rods and an actuating mechanism via a plurality of holes 1402. In some embodiments, the steering mechanism 1400 is the swivel drive component shown and described in FIG. 6. FIG. 15 illustrates a transparent version of a frame 1500 according to one embodiment of the present invention.

Figure 16:
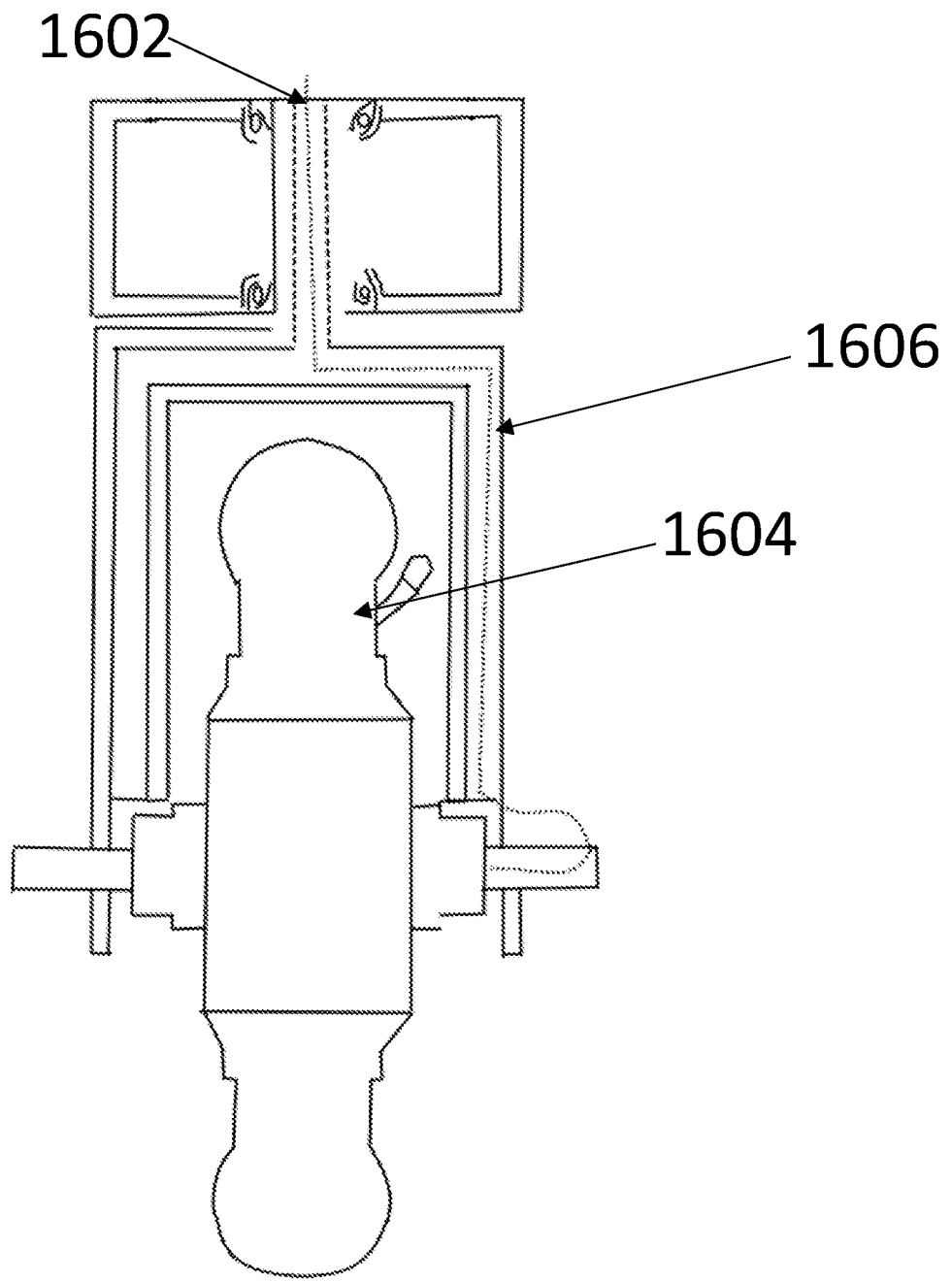
FIG. 16 illustrates a universal steering system according to one embodiment of the present invention.
Figure 17:
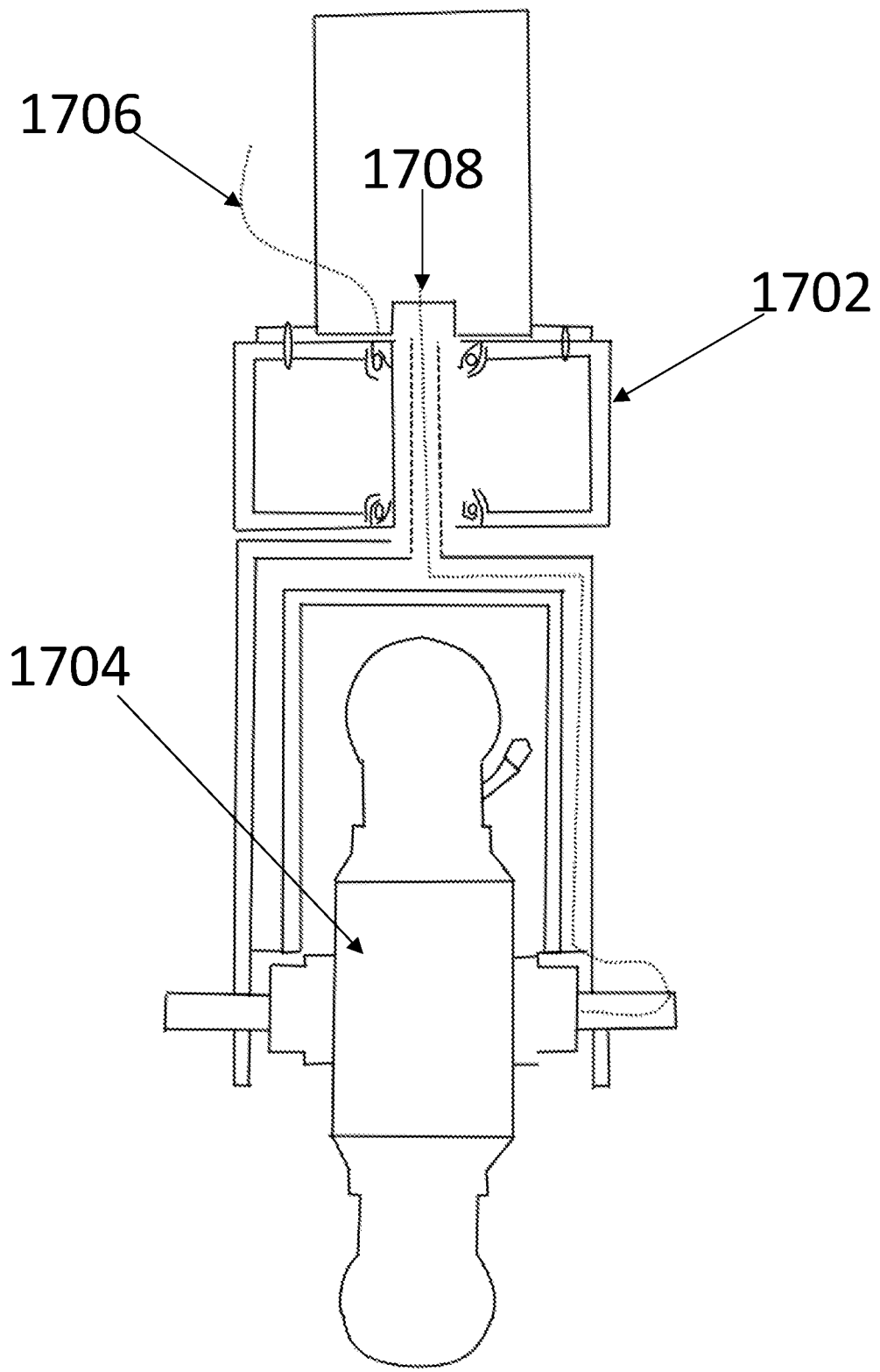
FIG. 17 illustrates a universal steering system including a wheel, a motor fork, and a hub motor according to one embodiment of the present invention.

FIG. 16 and FIG. 17 illustrate a wheel connection system for a universal steering system according to one embodiment of the present invention. For example, and without limitation, the universal steering system includes controllable electronics (1602, 1706, 1708) connected to a step motor and a hub motor. In one example, the hub motor 1704 is connected to a frame 1702 of the universal steering system via a motor fork. Advantageously, the motor fork is shock absorbing. The controllable electronics is designed to control the power of each motor and the deflection of each wheel in a universal steering system. For example, and without limitation, the controllable electronics monitor the wheel deflection status and power usage in real-time. Based on the wheel deflection status and power usage, the controllable electronics are configured to automatically transmit a command to at least one hub motor to increase or decrease power based on a target wheel deflection.

In one embodiment, the present invention includes a universal steering system including a first wheel and second wheel in the front of the system, and a third and fourth wheel positioned towards the rear of the system. The universal steering system is designed to angle the first wheel to 45 degrees to the left and the second wheel to 135 degrees to the right to turn the vehicle in place. In another example, the universal steering system is designed to angle the rear wheels in addition to the front wheels. Advantageously, this enables the universal steering device to turn in place and diagonally. In another embodiment, the universal steering system does not include a steering rod. In yet another embodiment, the combination of the wheels are summed to 180 degrees. Alternatively, in other configurations, the combination of the wheel deflections can be 60 degrees, 40 degrees, and/or 30 degrees.

In one embodiment, the universal steering system includes a stepper motor throttle fork, a spring, and a stepper motor designed to control the deflection of the wheel. In another embodiment, the present invention includes at least one electric motor designed to convert electric signals into mechanical rotation. For example, and not limitation, in one embodiment the electric motor is designed to send an electric pulse to motor drive, causing the motor to perform a precise angle of motion and/or deflection. The electric pulse is increased and/or decreased based on a frequency, so the step movement is operable to continuous rotation. The stepper motor is designed to be digitally controlled. In one embodiment, the steering mechanism is a ball and turn steering mechanism. In yet another embodiment, the universal steering vehicle is operable to spin along the length of the vehicle in a circular shape.

Figure 18:
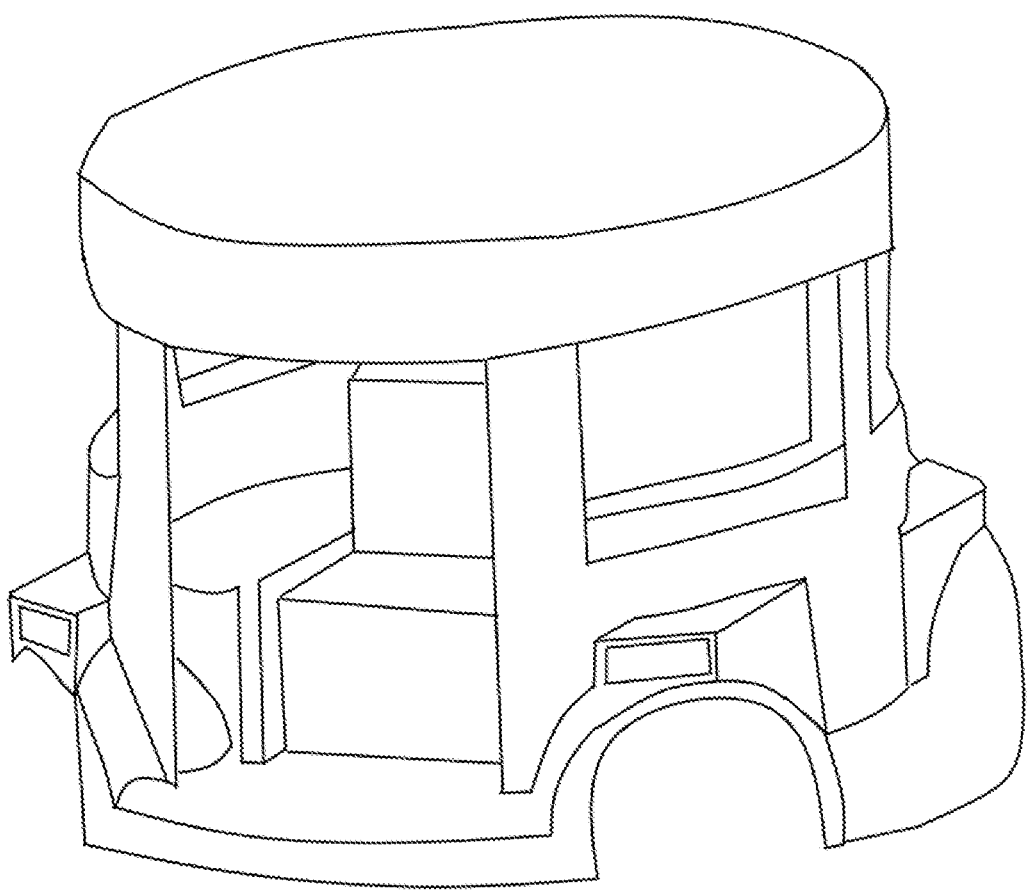
FIG. 18 illustrates a universal steering vehicle according to one embodiment of the present invention.

FIG. 18 illustrates a universal steering vehicle according to one embodiment of the present invention. As shown in FIG. 18, in one embodiment, the universal steering vehicle 1800 includes a circular body and a plurality of wheels. The universal steering vehicle includes a box chassis. In another embodiment, the chassis is egg or horseshoe shaped. The universal steering vehicle further includes a steering mechanism (e.g., steering wheel) designed to control the plurality of wheels. The universal steering wheel includes curved bumpers positioned between each wheel of the plurality of wheels to provide protection from external impact.

In another embodiment, the universal steering system includes an extendable wheelbase. For example, and not limitation, the extendable wheelbase is operable to increase the horizontal and/or vertical distance between the plurality of wheels. Advantageously, this enables the universal steering vehicle to adapt to different environments and spaces that require increasing or decreasing turning radius. For example, and not limitation, if a vehicle has a turning radius too large for a parking spot, then the universal steering vehicle is operable to decrease size and turning radius to fit within a parking spot. The universal steering vehicle further includes an extendable body and/or is operable to receive an extension component. For example, when the wheelbase is extended in a horizontal direction, the universal steering vehicle is operable to receive an extension component that connects a front body component to a second body component. The extension component further includes at least one additional seat and/or storage component to increase the seating and storage of the vehicle. Yet another advantage of the universal steering vehicle includes adjusting the size of the universal steering vehicle to push or pull a trailer. The universal steering vehicle is operable to push and/or pull a trailer in any direction.

In one embodiment, the present invention includes a control system designed to determine the speed of a curve and control the angle of deflection based on the speed of the curve. In another embodiment, the present invention includes a 12 volts motor. The control system is designed to control the voltage for at least one motor based on a speed of a vehicle and curve. The controlled voltage limits the rotations per minute of a corresponding wheel. In another embodiments, the motor includes at least one of a 12V motor, a 24V motor, a 36V motor, and/or a 48V motor.

In yet another embodiment, the motor includes a phase motor. For example, and not limitation, the phase motor includes a single-phase, a two-phase motor, and/or a three-phase motor, and at least one phase controller. In another embodiment, the present invention includes at least one motor per wheel of a vehicle. For example, and not limitation, each motor has equivalent power. In another embodiment, each motor has a different amount of power. The vehicle further includes at least one controller connected to each motor. In some embodiments, the motor or battery is positioned under the body chassis, in a wheel, between the top and bottom plate of the frame, and/or other open areas of a vehicle. Advantageously, when a motor or battery is positioned within a tire, the center of gravity of the car is lowered and decreases flip-overs.

Figure 19:
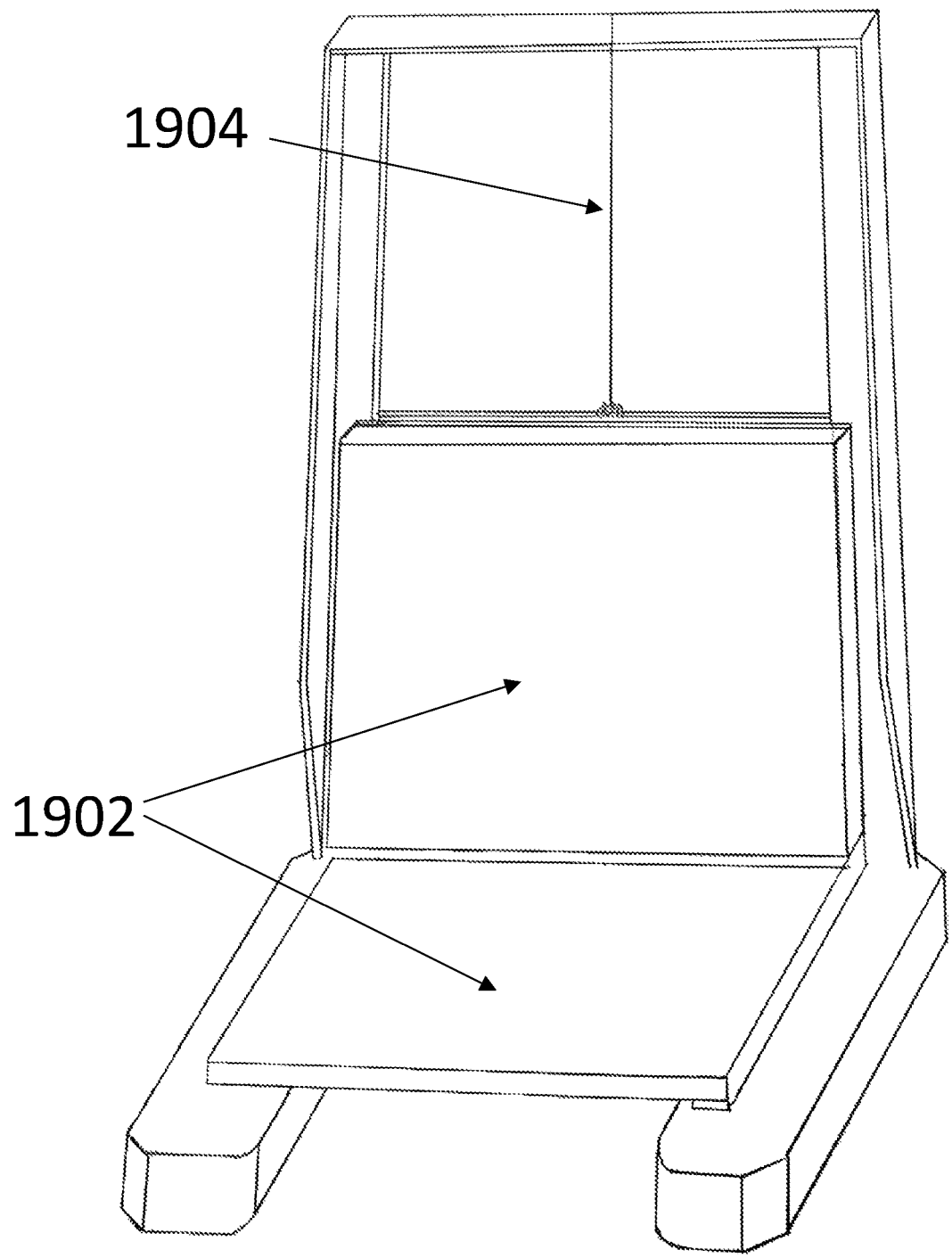
FIG. 19 illustrates a universal steering lift chair according to one embodiment of the present invention.

In one embodiment, as shown in FIG. 19, the present invention includes a lift chair 1900. The lift chair includes an adjustable seat 1902 designed to lift a person up to stand within the frame. For example, and without limitation, the seat of wheelchair includes a wrench and/or other actuating component (e.g., actuator) 1904 that is designed to pull up the seat and/or individual. Alternatively, or additionally, the lift seat includes an actuator, and/or other similar movement mechanism designed to move an individual positioned in the adjustable seat. For further example, and not limitation, the adjustable seat is designed to roll along a track to move from a horizontal position to a vertical position as a user is picked up via the wrench or similar mechanism attached to a harness. The adjustable seat, when in the horizontal position, is operable to function as a gurney and enable the lift chair to roll around while a user is in a horizontal position. The lift chair is further operable to attach to a universal steering frame as previously described throughout this specification. Advantageously, the lift char is operable to turn around in space including an open central area to allow for a person to stand and/or perform exercises (e.g., physical therapy) while staying within the protection of the chair. This central open area is further useable to lift a patient and spin them around to access a chair, bed, commode, or bath without the danger of falling or being dropped by a caregiver. This is particularly advantageous for retirement homes and similar environments, where individuals may have mobility issues.

As further example, and without limitation, the universal steering system enables a barge to turn around in place and a ship or submarine to rotate in place. In yet another exemplary embodiment, the universal steering system is designed for a car to spin around in place and to prevent it from backing up in a tight place. The car includes a circular bumper system designed to prevent backing accidents and reduce the side impact dangers. In one embodiment, the car is an all-terrain vehicle with the ability to spin around within the diameter of the vehicle. In another example, the present invention includes a universal steering vehicle designed to push and or pull a trailer without looking back. This is particularly advantageous for luggage carts at airports, dock yards, barn halls, and carports.

In one embodiment, the present invention includes a universal steering system designed for three-dimensional steering. In order to move in three dimensions a vehicle must be able to apply forces in all three directions (e.g., x direction, y direction, and z direction). Conventional steering can only apply forces in two directions (e.g., x direction and y direction), based upon the friction between the wheel and the surface on which it travels. In order to steer in the air, the vehicle must be able to exert forces upon the medium in which it travels. For this reason, the aerial vehicle includes wings, lift blades, and/or other propulsion mechanisms that enable the vehicle to turn in a desired direction. The universal steering system is designed to control the deflection of each wheel or wheel-like component (e.g., wing, lift blade) based on a desired speed, curve, location, and/or destination.

Any combination of one or more computer-readable medium(s) may be utilized. The computer-readable medium may be a computer readable signal medium or a computer-readable storage medium (including, but not limited to, non-transitory computer-readable storage media). A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby, JavaScript, Java, Python, Ruby, PHP, C, C++, C#, Objective-C, Go, Scala, Swift, Kotlin, OCaml, SAS, Tensorflow, CUDA, or the like. The program code may execute entirely on the user's computer, partly on the user's computer, as a stand-alone software package, partly on the user's computer, and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

These computer program instructions may be provided to a processor of a general-purpose computer, special purpose computer, or other programmable data processing apparatus to produce a machine, such that the instructions, which execute via the processor of the computer or other programmable data processing apparatus, create an ability for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A universal steering system comprising:
   a frame;
   at least one motor;
   a plurality of wheels;
   at least one processor; and
   at least one steering system including at least one steering component, at least one actuating mechanism, and at least two steering rods;
      wherein the frame is connected to the plurality of wheels;
      wherein the at least one steering component is connected to the at least one actuating mechanism and the at least two steering rods, wherein the at least one actuating mechanism is operable to move the at least one steering component in a counterclockwise motion or a clockwise motion;
      wherein the at least one processor is in electric communication with the plurality of wheels and the at least one motor; and
      wherein, via the at least one motor, the at least one processor is designed to control each wheel of the plurality of wheels, wherein the at least one processor is operable to deflect at least one wheel of the plurality of wheels.

2. The universal steering system of claim 1, wherein each rod of the at least two steering rods is in a geared connection with at least one gear, wherein the at least one gear is connected to at least one wheel of the plurality of wheels.

3. The universal steering system of claim 2, wherein, in response to movement of the at least one steering component, the at least two steering rods are operable to push or pull a corresponding gear, wherein the corresponding gear rotates in response to the push or pull of the at least two steering rods.

4. The universal steering system of claim 3, wherein, in response to the corresponding gear rotating, at least one wheel of the plurality of wheels rotates.

5. The universal steering system of claim 3 further comprising a plurality of motors, wherein at least one motor of the plurality of motors corresponds to at least one wheel of the plurality of wheels.

6. The universal steering system of claim 5, wherein the at least one motor includes a plurality of motors, wherein the at least one processor is designed to separately control each motor of the plurality of motors.

7. A universal steering system comprising:
   a frame including a top plate and a bottom plate;
   a plurality of motors;
   a plurality of wheels;
   at least one processor; and
   a steering system comprising at least one steering component, at least one actuating mechanism, and at least two steering rods, wherein the at least one steering component is connected to the at least one actuating mechanism and the at least two steering rods;
      wherein the frame is connected to the plurality of wheels;
      wherein the at least one actuating mechanism is operable to move the at least one steering component in a counterclockwise motion and a clockwise motion;
      wherein the plurality of motors is in electric communication with the at least one processor;
      wherein at least one motor of the plurality of motors is connected to at least one wheel of the plurality of wheels; and
      wherein, via the plurality of motors, the at least one processor is designed to control each wheel of the plurality of wheels, wherein the at least one processor is operable to deflect at least one wheel of the plurality of wheels.

8. The universal steering system of claim 7, wherein the plurality of wheels includes at least two wheels positioned about a front of the frame, wherein the plurality of wheels includes at least two wheels positioned about a rear of the frame, wherein a deflection of at least one front wheel results in an opposite deflection of at least one rear wheel.

9. The universal steering system of claim 7, wherein the universal steering system is a wheelchair.

10. The universal steering system of claim 7, wherein the plurality of wheels is equally spaced apart.

11. A universal steering system comprising:
    a frame;
    at least one motor;
    a plurality of wheels;
    at least one processor; and
    a steering system comprising at least one steering component, at least one actuating mechanism and at least two steering rods, wherein the at least one steering component is connected to the at least one actuating mechanism and the at least two steering rods;
       wherein the plurality of wheels is equally spaced apart;
       wherein the frame is connected to the plurality of wheels via a plurality of shafts;
       wherein the at least one actuating mechanism is operable to move the at least one steering component in a counterclockwise motion or a clockwise motion;
       wherein each wheel is in electric communication with the at least one processor; and
       wherein the at least one processor is designed to control each wheel of the plurality of wheels, wherein the at least one processor is operable to deflect at least one wheel of the plurality of wheels.

12. The universal steering system of claim 11 further comprising a plurality of motors, wherein at least one motor of the plurality of motors corresponds to at least one wheel of the plurality of wheels.

13. The universal steering system of claim 12, wherein the at least one processor is designed to separately control each motor of the plurality of motors.

14. The universal steering system of claim 11, wherein the universal steering system is a wheelchair.

15. The universal steering system of claim 11, wherein each rod of the at least two steering rods is in a geared connection with at least one gear, wherein the at least one gear is connected to at least one wheel of the plurality of wheels, wherein, in response to movement of the at least one steering component, the at least two steering rods are operable to push or pull a corresponding gear, wherein the corresponding gear rotates in response to the push or pull of the at least two steering rods.

* * * * *